(12) United States Patent
Matsumoto et al.

(10) Patent No.: US 8,430,493 B2
(45) Date of Patent: Apr. 30, 2013

(54) INK COMPOSITION, INK SET AND INKJET IMAGE FORMING METHOD

(75) Inventors: Jun Matsumoto, Kanagawa (JP);
Tomoyuki Ohzeki, Kanagawa (JP);
Masao Ikoshi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 343 days.

(21) Appl. No.: 12/881,193

(22) Filed: Sep. 14, 2010

(65) Prior Publication Data

US 2011/0069110 A1    Mar. 24, 2011

(30) Foreign Application Priority Data

Sep. 18, 2009   (JP) .................................. 2009-217795

(51) Int. Cl.
*G01D 11/00*   (2006.01)

(52) U.S. Cl.
USPC .............................. 347/100; 347/95; 523/160

(58) Field of Classification Search .................. 347/100, 347/95, 96, 101, 88, 99, 21, 20, 9; 106/31.6, 106/31.27, 31.13; 523/160, 161
See application file for complete search history.

(56) References Cited

U.S. PATENT DOCUMENTS

| | | | | |
|---|---|---|---|---|
| 5,919,291 | A * | 7/1999 | Hotomi et al. | 106/31.6 |
| 6,439,708 | B1 * | 8/2002 | Kato et al. | 347/100 |
| 2007/0216743 | A1 * | 9/2007 | Makuta et al. | 347/100 |
| 2009/0202723 | A1 * | 8/2009 | Ikoshi et al. | 106/31.13 |
| 2009/0202724 | A1 * | 8/2009 | Arai et al. | 106/31.86 |
| 2009/0203833 | A1 * | 8/2009 | Sasada et al. | 524/558 |
| 2010/0053288 | A1 | 3/2010 | Ohzeki | |
| 2010/0166962 | A1 | 7/2010 | Ohzeki | |

FOREIGN PATENT DOCUMENTS

| | | |
|---|---|---|
| EP | 1022151 A | 7/2000 |
| EP | 1760122 A | 3/2007 |
| JP | 9-227812 A | 9/1997 |
| JP | 9-272826 A | 10/1997 |
| JP | 11-10856 A | 1/1999 |
| JP | 11-12516 A | 1/1999 |
| JP | 11-115303 A | 4/1999 |
| JP | 2000-351931 A | 12/2000 |
| JP | 2001-329199 A | 11/2001 |
| JP | 2003-103897 A | 4/2003 |
| JP | 3550637 B2 | 8/2004 |
| JP | 2005-23102 A | 1/2005 |
| JP | 2007-77371 A | 3/2007 |
| JP | 2007-326231 A | 12/2007 |
| JP | 2008-6809 A | 1/2008 |
| JP | 2008-198642 A | 8/2008 |
| JP | 2009-173867 A | 8/2009 |
| WO | WO 2009001967 A1 * | 12/2008 |

\* cited by examiner

*Primary Examiner* — Manish S Shah
(74) *Attorney, Agent, or Firm* — SOLARIS Intellectual Property Group, PLLC

(57) ABSTRACT

The present invention provides an inkjet ink composition including: self-dispersing polymer particles, each of the self-dispersing polymer particles including a structural unit derived from a hydrophilic monomer and a structural unit derived from a hydrophobic monomer; colloidal silica; and colorant particles, the inkjet ink composition having excellent dischargeability and suppressing the deterioration of the liquid repellency of an inkjet head member.

15 Claims, 2 Drawing Sheets

INK COMPOSITION, INK SET AND INKJET IMAGE FORMING METHOD

CROSS-REFERENCE TO RELATED APPLICATION

This application claims priority under 35 USC 119 from Japanese Patent Application No. 2009-217795 filed on Sep. 18, 2009, the disclosure of which is incorporated by reference herein.

BACKGROUND OF THE INVENTION

1. Field of Invention

The present invention relates to an ink composition, an ink set, and an inkjet image forming method.

2. Description of the Related Art

In recent years, as a result of ever-increasing demand for the protection of resources, protection of the environment, enhancement of operational stability and the like, the conversion of inks into aqueous products is advancing. As in the case of oil-based inks, the product qualities demanded from aqueous inks include fluidity, storage stability, glossiness of film, clarity, coloring ability and the like. However, compared to oil-based vehicles, most pigments have a markedly poor adaptability to aqueous vehicles with respect to pigment dispersibility and the like, and therefore, satisfactory product quality cannot be obtained by conventional dispersion methods. In the past, the use of various additives, for example, aqueous pigment dispersing resins or surfactants, has been examined, but an aqueous ink that satisfies all the adaptation properties described above and is comparable to existing oil-based inks having high product quality, has not been obtained.

In order to solve these problems, for example, an aqueous ink composition containing a colorant, which is coated by a water-insoluble polymer, as a color material, and polymer particles has been disclosed (see, for example, Japanese Patent Application Laid-Open (JP-A) No. 2001-329199). Further, an ink composition containing resin emulsion and inorganic oxide colloid has been disclosed (see, for example, Japanese Patent No. 3550637), and it is described that a good image can be formed.

SUMMARY OF THE INVENTION

According to an aspect of the invention, an inkjet ink composition including self-dispersing polymer particles, each of the self-dispersing polymer particles including a structural unit derived from a hydrophilic monomer and a structural unit derived from a hydrophobic monomer; colloidal silica; and colorant particles; the inkjet ink composition having excellent dischargeability and suppressing the deterioration of the liquid repellency of an inkjet head member, is provided. According to another aspect of the invention, an ink set including the inkjet ink composition, and an inkjet image forming method by using the inkjet ink composition, are provided.

BRIEF DESCRIPTION OF THE DRAWINGS

Exemplary embodiments of the present invention will be described in detail based on the following figures, wherein.

DETAILED DESCRIPTION

Figure 1:
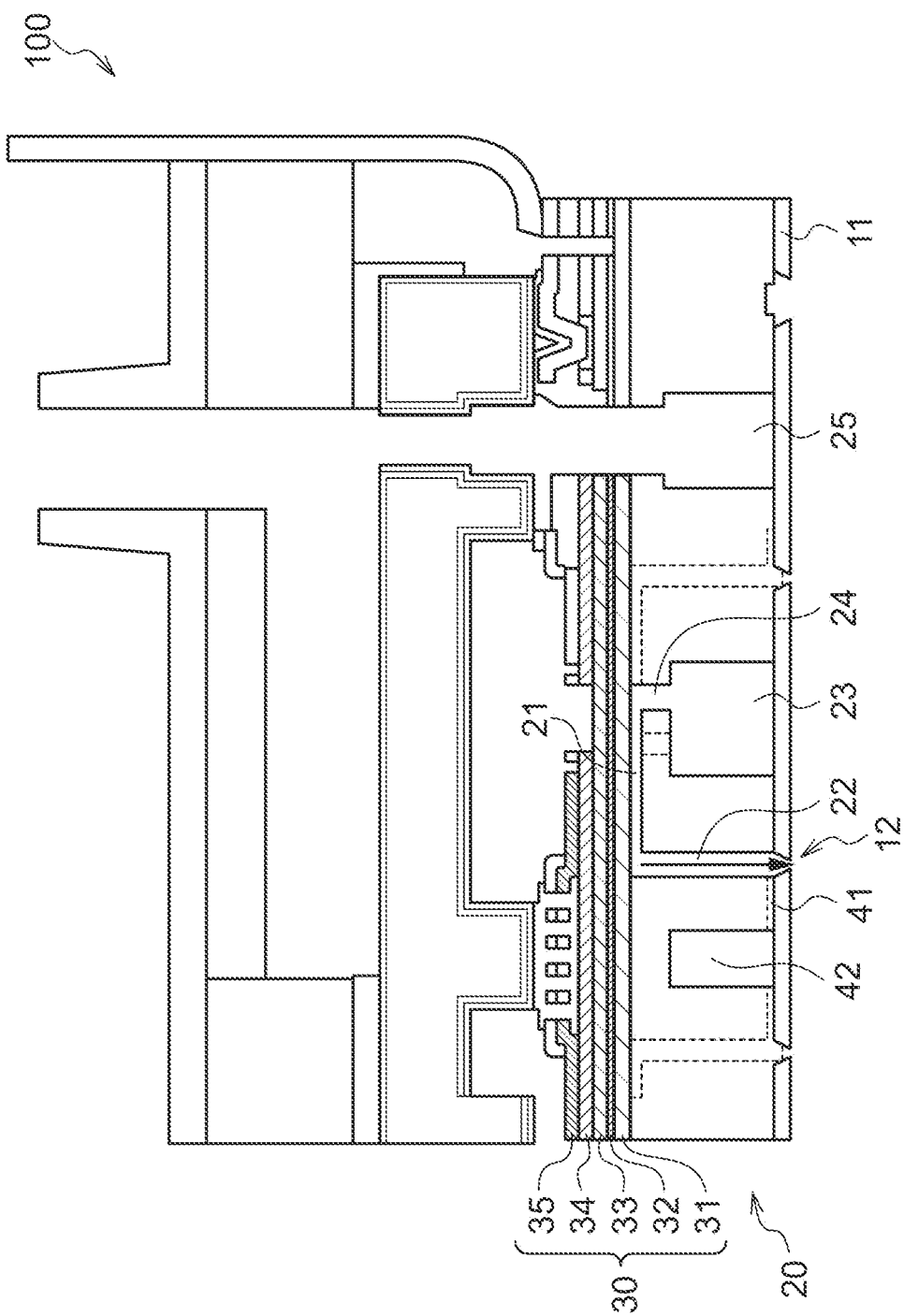
FIG. 1 is a conceptual sectional view showing an example of the inner structure of an inkjet head.

Although scratch resistance of the images formed is improved by using the aqueous ink composition described in JP-A No. 2001-329199, it can hardly be said that the aqueous ink composition is satisfactory in view of dischargeability. Further, when an ink composition includes polymer particles, like the aqueous ink composition described in Japanese Patent No. 3550637, there are cases where liquid repellency of a liquid-repellent film in an inkjet head member lowers.

The present invention is made in view of the circumstances. An aspect of the present invention is directed to provide an ink composition for inkjet recording, with which dischargeability is excellent and lowering of liquid repellency of an inkjet head member is suppressed. Further, another aspect of the present invention is directed to provide an ink set including the ink composition and an inkjet image forming method.

Exemplary embodiments according to the aspect of the invention include, but are not limited to the following items <1> to <14>.

<1> An inkjet ink composition including self-dispersing polymer particles, colloidal silica, and colorant particles, each of the self-dispersing polymer particles including a structural unit derived from a hydrophilic monomer and a structural unit derived from a hydrophobic monomer.

<2> The inkjet ink composition according to the item <1>, wherein the glass transition temperature of self-dispersing polymers which are included in the self-dispersing polymer particles is 120° C. or higher.

<3> The inkjet ink composition according to the item <1> or the item <2>, wherein an I/O value of self-dispersing polymers which are included in the self-dispersing polymer particles is from 0.20 to 0.55.

<4> The inkjet ink composition according to anyone of the items <1> to <3>, having a pH value in a range of from 7.5 to 10 at a temperature of 25° C.

<5> The inkjet ink composition according to anyone of the items <1> to <4>, wherein a volume average particle diameter of the colloidal silica is 25 nm or less.

<6> The inkjet ink composition according to anyone of the items <1> to <5>, wherein the content of the colloidal silica is from 0.005% by mass to 0.5% by mass with respect to the total mass of the inkjet ink composition.

<7> The inkjet ink composition according to anyone of the items <1> to <6>, wherein the content ratio of the colloidal silica with respect to the self-dispersing polymer particles (colloidal silica/self-dispersing polymer particles) in the inkjet ink composition is from 0.0001 to 0.1 on the basis of mass.

<8> The inkjet ink composition according to anyone of the items <1> to <7>, wherein the structural unit derived from the hydrophilic monomer comprises a carboxy group.

<9>. The inkjet ink composition according to the item <8>, wherein an acid value of self-dispersing polymers which are included in the self-dispersing polymer particles is in a range of from 20 mgKOH/g to 200 mgKOH/g.

<10> The inkjet ink composition according to anyone of the items <1> to <9>, wherein the structural unit derived from the hydrophobic monomer comprises a cyclic aliphatic group.

<11> The inkjet ink composition according to the item <10>, wherein the hydrophobic monomer includes at least one of a bicycloalkyl(meth)acrylate or a polycycloalkyl(meth)acrylate having three or more rings.

<12> An ink set comprising at least one of the inkjet ink composition of anyone of the items <1> to <11>, and at least one treatment liquid configured to form an aggregate when contacted with the inkjet ink composition.

<13> An inkjet image forming method in which the inkjet ink composition of anyone of the items <1> to <11> is discharged from an inkjet head equipped with a silicon nozzle plate, onto a recording medium thereby forming an image.

<14> The inkjet image forming method of the item <13> further comprising applying a treatment liquid which is capable of forming an aggregate when contacted with the inkjet ink composition according to the items <1> to <11>, onto the recording medium.

<Ink Composition for Inkjet Recording>

The ink composition for inkjet recording of the present invention (hereinafter, may be simply referred to as "ink composition") is configured to include at least one type of colorant particles, at least one type of particles of a self-dispersing polymer including a structural unit derived from a hydrophilic monomer and a structural unit derived from a hydrophobic monomer, and at least one type of colloidal silica, and, if necessary, other components.

By using the ink composition having such configuration, ink dischargeability is excellent and lowering of liquid repellency of an inkjet head member is suppressed.

In general, liquid repellency is imparted to the member that constructs the inkjet head in order to maintain the ink ejection performance. This liquid repellency can be imparted, for example, by processing the member surface using a fluorine-containing surface finishing agent. It is known that the liquid repellency of the inkjet head member gradually lowers when the inkjet head is used over a long period of time.

Further, there is a case where a nozzle plate is configured to include silicon or the like in order to precisely form especially fine nozzles (discharge ports). Also in the inkjet head equipped with such a nozzle plate formed from silicon or the like, there are cases where the lowering of liquid repellency of the nozzle plate exerts influence on the ink dischargeability.

The ink composition for inkjet recording of the present invention can suppress the lowering of liquid repellency of the inkjet head member more effectively, even in the case of using an inkjet head equipped with such a nozzle plate formed from silicon or the like.

[Colloidal Silica]

Colloidal silica is colloid that comprises fine particles of inorganic oxides including silicon, in which an average particle diameter of the fine particles is several hundred nm or less. Colloidal silica includes silicon dioxide (including hydrates thereof) as a main component and may contain aluminate as a minor component. Examples of the aluminate, which may be contained as a minor component, include sodium aluminate and potassium aluminate.

Further, inorganic salts such as sodium hydroxide, potassium hydroxide, lithium hydroxide, and ammonium hydroxide or organic salts such as tetramethylammonium hydroxide may be contained in the colloidal silica. These inorganic salts and organic salts function, for example, as a stabilizer of colloid.

The dispersing medium for colloidal silica is not particularly limited and may be any of water, an organic solvent, or a mixture of water and an organic solvent. The organic solvent may be a water-soluble organic solvent or a water-insoluble organic solvent. However, the organic solvent is preferably a water-soluble organic solvent. Specific examples thereof include methanol, ethanol, isopropyl alcohol, and n-propanol.

There is no particular limitation on the method for producing colloidal silica, and colloidal silica can be produced by a generally used method. For example, colloidal silica can be produced through an Aerosil synthesis by thermal decomposition of silicon tetrachloride, or may be produced from water glass. Alternatively, colloidal silica can be produced according to a liquid phase synthesis method including hydrolysis of an alkoxide (see, for example, "Seni to Kogyo", vol. 60, No. 7, page 376, 2004), or the like.

There is no particular limitation on the average particle diameter of the particles contained in the colloidal silica according to the present invention. For example, the average particle diameter may be set from 1 nm to 200 nm. The average particle diameter is preferably from 1 nm to 100 nm, more preferably from 3 nm to 50 nm, even more preferably from 3 nm to 25 nm, and particularly preferably from 5 nm to 20 nm.

When the average particle diameter is 200 nm or less, damages (for example, lowering of liquid repellency or the like) caused by ink to the members which construct the inkjet head, such as a substrate, a protective film, a liquid-repellent film, and the like, may be more effectively suppressed. It is thought that, by making the average particle diameter smaller, a total surface area of particles increases, so that damages to the members which construct the inkjet head is more effectively suppressed. Moreover, it is preferable that the average particle diameter of the particles is 200 nm or less, also from the viewpoints of dischargeability of the ink composition and suppression of the abrasive effect caused by the particles. Further, when the average particle diameter is 1 nm or more, productivity is enhanced, and colloidal silica that exhibits a smaller dispersion in performance may be obtained.

In the present invention, the average particle diameter of the colloidal silica is represented by a volume average particle diameter. The volume average particle diameter can be determined according to a general method for dispersed particles such as a light scattering method or a laser diffraction method.

The shape of the colloidal silica is not particularly limited so long as it does not disturb the ejection performance of the ink. For example, the shape may be a spherical shape, a long shape, a needle-like shape, or a shape like a string of beads. Above all, it is preferred that the colloidal silica is spherical, from the viewpoint of dischargeability of ink.

The colloidal silica, which can be used in the present invention, may be produced by the production method described above, or may be a commercially available product. Specific examples of the commercially available product include LUDOX AM, LUDOX AS, LUDOX LS, LUDOX TM, and LUDOX HS (all trade names, manufactured by E.I. Du Pont de Nemours & Co.); SNOWTEX S, SNOWTEX XS, SNOWTEX 20, SNOWTEX 30, SNOWTEX 40, SNOWTEX N, SNOWTEX C, and SNOWTEX O (all trade names, manufactured by Nissan Chemical Industries, Ltd.); SYTON C-30 and SYTON ZOO (all trade names, manufactured by Monsanto Co.); NALCOAG-1060 and NALCOAG-ID21 to 64 (all trade names, manufactured by Nalco Chem. Co.); METHANOL SOL, IPA SOL, MEK SOL, and TOLUENE SOL (all trade names, manufactured by Fuso Chemical Co., Ltd.), CATALOID-S, CATALOID-F120, CATALOID SI-350, CATALOID SI-500, CATALOID SI-30, CATALOID S-20L, CATALOID S-20H, CATALOID S-30L, CATALOID S-30H, CATALOID SI-40, and OSCAL-1432 (isopropyl alcohol sol) (all trade names, manufactured by JGC Catalysts and Chemicals Ltd.); ADELITE (trade name, manufactured by Asahidenka Co., Ltd.); and, as examples of colloidal silica in the shape of a string of beads, SNOWTEX ST-UP, SNOWTEX PS-S, SNOWTEX PS-M, SNOWTEX ST-OUP, SNOWTEX PS-SO, and SNOWTEX PS-MO (all trade names, manufactured by Nissan Chemical Industries, Ltd.). These products are easily available.

The pH of the above commercially available colloidal silica dispersion liquid is often adjusted to pH of acidic or alkaline. This is because the region where colloidal silica is stably dispersed exists in an acidic side or alkaline side. In the case of adding a commercially available colloidal silica dispersion liquid to the ink composition, the pH of the region where the colloidal silica is stably dispersed and the pH of the ink composition should be taken in consideration.

The content of the colloidal silica in the ink composition in exemplary embodiments of the invention is not particularly limited. For example, the content can be set from 0.0001% by mass to 10% by mass with respect to the total mass of the ink composition. The content of the colloidal silica is preferably from 0.001% by mass to 1% by mass with respect to the total mass of the ink composition, more preferably from 0.005% by mass to 0.5% by mass with respect to the total mass of the ink composition, and particularly preferably from 0.01% by mass to 0.1% by mass with respect to the total mass of the ink composition. When the content of the colloidal silica in the ink composition is equal to or less than the upper limit described above, the dischargeability of the ink composition is further enhanced, and the influence of the abrasive effect caused by silica particles upon the inkjet head may be more effectively suppressed. Further, when the content is equal or greater than the lower limit described above, the lowering of liquid repellency of the inkjet head member may be more effectively suppressed.

Moreover, it is preferable that the ink composition of the present invention contains colloidal silica having a volume average particle diameter of from 3 nm to 25 nm in an amount of from 0.001% by mass to 1% by mass with respect to the total mass of the ink composition, from the viewpoints of suppression of the lowering of liquid repellency of the inkjet head member and the ink dischargeability. It is more preferable that the ink composition contains colloidal silica having a volume average particle diameter of from 5 nm to 20 nm in an amount of from 0.005% by mass to 0.5% by mass with respect to the total mass of the ink composition.

[Self-Dispersing Polymer Particles]

The ink composition for inkjet recording of the present invention contains at least one type of particles of self-dispersing polymers including a structural unit derived from a hydrophilic monomer and a structural unit derived from a hydrophobic monomer. Further, the self-dispersing polymer particles are configured to include a self-dispersing polymer (hereinafter, referred to as a "first polymer" in some cases) including at least one type of the structural unit derived from a hydrophilic monomer and at least one type of the structural unit derived from a hydrophobic monomer.

When the self-dispersing polymer particles are incorporated, an ink composition can be constructed, with which dischargeability is excellent and the images formed have excellent scratch resistance.

The self-dispersing polymer according to exemplary embodiments of the invention means a water-insoluble polymer which can be in a dispersed state in an aqueous medium due to the functional group (particularly, an acidic group or a salt thereof) of the polymer itself when brought to a dispersed state by an phase inversion emulsification method in the absence of a surfactant.

Here, the term dispersed state includes both an emulsified state (emulsion) in which a water-insoluble polymer is dispersed in an aqueous medium in the liquid state, and a dispersed state (suspension) in which a water-insoluble polymer is dispersed in an aqueous medium in the solid state.

In regard to the self-dispersing polymer according to exemplary embodiments of the invention, it is preferable that the water-insoluble polymer is a self-dispersing polymer capable of being in a dispersed state in the solid state, from the viewpoint of ink fixation properties obtainable when incorporated in an ink composition.

The method for preparing the emulsified or dispersed state of the self-dispersing polymer, that is, an aqueous dispersion of the self-dispersing polymer, may be a phase inversion emulsification method. The phase inversion emulsification method may be, for example, a method of dissolving or dispersing the self-dispersing polymer into a solvent (for example, a hydrophilic organic solvent or the like), subsequently introducing the solution or dispersion directly into water without adding a surfactant, mixing under stirring the system while a salt-producing group (for example, an acidic group) carried by the self-dispersing polymer is neutralized, removing the solvent, and then obtaining an aqueous dispersion that has been brought to an emulsified or dispersed state.

A stable emulsified or dispersed state for the self-dispersing polymer in exemplary embodiments of the invention means that even when a solution prepared by dissolving 30 g of a water-insoluble polymer in 70 g of an organic solvent (for example, methyl ethyl ketone), a neutralizing agent capable of neutralizing 100% of the salt-producing group of the water-insoluble polymer (if the salt-producing group is anionic, sodium hydroxide, and if the salt-producing group is cationic, acetic acid), and 200 g of water are mixed and stirred (apparatus: a stirring apparatus equipped with a stirring blade, speed of rotation 200 rpm, for 30 minutes, 25° C.), and then the organic solvent is removed from the liquid mixture, the emulsified or dispersed state remains stable for at least one week at 25° C., so that the generation of precipitates cannot be verified by visual inspection.

The stability of the emulsified or dispersed state for the self-dispersing polymer can be confirmed by a precipitation acceleration test based on centrifugation. The stability obtained by a precipitation acceleration test based on centrifugation can be evaluated by, for example, adjusting the aqueous dispersion of the polymer particles obtained by the method described above to a solids concentration of 25% by mass, subsequently centrifuging the dispersion for one hour at 12,000 rpm, and measuring the solids concentration of the supernatant obtained after centrifugation.

When the ratio of the solids concentration after centrifugation to the solids concentration before centrifugation is large (a value close to 1), it means that precipitation of the polymer particles resulting from centrifugation does not occur, that is, the aqueous dispersion of the polymer particles is more stable. According to the present invention, the ratio of the solids concentration before and after centrifugation is preferably 0.8 or greater, more preferably 0.9 or greater, and particularly preferably 0.95 or greater.

Further, the water-insoluble polymer means a polymer showing an amount of dissolution of 10 g or less when the polymer is dried at 105° C. for 2 hr and then dissolved in 100 g of water at 25° C. The amount of dissolution is, preferably, 5 g or less and, more preferably, 1 g or less. The amount of dissolution is the amount of dissolution when the polymer is neutralized with sodium hydroxide or acetic acid to 100% in accordance with the kind of the salt-forming group of the water-insoluble polymer.

The self-dispersing polymer according to exemplary embodiments of the invention is such that the content of the water-soluble component exhibiting water-solubility when brought to a dispersed state is preferably 10% by mass or less, more preferably 8% by mass or less, and further preferably 6% by mass or less. When the water-soluble component is 10% by mass or less, swelling of the polymer particles or fusion of the polymer particles is effectively suppressed, and a more stable dispersed state can be maintained. Viscosity increase of the ink composition can also be suppressed, and the ejection stability becomes better.

Here, the water-soluble component means a compound contained in the self-dispersing polymer, where the compound dissolves in water when the self-dispersing polymer is brought to a dispersed state. The water-soluble component is a water-soluble compound that is side-produced or incorporated during the production of the self-dispersing polymer.

There is no particular limitation on the glass transition temperature of the first polymer (self-dispersing polymer) in exemplary embodiments of the invention. The glass transition temperature is, however, preferably 120° C. or higher, more preferably from 120° C. to 250° C., further more preferably from 150° C. to 250° C., and even more preferably from 160° C. to 200° C. When the glass transition temperature is 120° C. or higher, blocking resistance (particularly, under high temperature and high humidity conditions) of the images formed is enhanced. Further, when the glass transition temperature is 250° C. or lower, the scratch resistance of the images is enhanced.

The glass transition temperature of the first polymer can be suitably controlled in accordance with generally used methods. For example, the glass transition temperature of the first polymer can be adjusted to be within a desired range by appropriately selecting the types of the polymerizable groups of monomers that constitute the first polymer, the types of the substituents on the monomers, the ratio of the constituent monomers, the molecular weight of the polymer molecule, and the like.

For the glass transition temperature (Tg) of the first polymer according to exemplary embodiments of the invention, a measured Tg that is obtainable by actual measurement is applied. Specifically, the measured Tg means a value measured under conventional measurement conditions using a differential scanning calorimeter (DSC) EXSTAR6220 (trade name) manufactured by SII Nanotechnology, Inc.

However, if measurement is difficult due to degradation of the polymer or the like, a calculated Tg that is computed by the following calculation formula, is applied.

The calculated Tg is calculated by the following formula (1):

$$1/Tg = \Sigma(X_i/Tg_i) \quad (1)$$

Here, it is assumed that in the polymer serving as the object of calculation, n species of monomer components, with i being from 1 to n, are copolymerized. $X_i$ is the weight fraction of the $i^{th}$ monomer ($\Sigma X_i=1$), and $Tg_i$ is the glass transition temperature (absolute temperature) of a homopolymer of the $i^{th}$ monomer, provided that $\Sigma$ takes the sum of i=1 to i=n. Furthermore, for the value of the glass transition temperature of a homopolymer of each monomer ($Tg_i$), the values given in Polymer Handbook ($3^{rd}$ edition) (J. Brandrup, E. H. Immergut, (Wiley-Interscience, 1989)) are employed.

The I/O value of the first polymer in the present invention is not particularly restricted. The value is, however, preferably from 0.20 to 0.55, and more preferably 0.30 to 0.54, and even more preferably from 0.40 to 0.50.

If the I/O value of the first polymer is 0.20 or greater, the stability of the ink composition may be improved. If the I/O value is not greater than 0.55, blocking resistance (particularly, under high temperature and high humidity conditions) may be increased.

The I/O value, which is also called as an inorganicity value/organicity value, is a value that deals with the polarity of various organic compounds in an organic conceptual manner, and is one of functional group contribution methods setting parameters to each functional group.

The I/O value is explained in detail in "Organic Conceptual Diagram" (by Koda Yoshio, published by Sankyo Publishing Co., Ltd. (1984) and the like. The concept of the I/O value is to indicate the result of dividing the properties of a compound into organic groups representing covalent bonding properties and inorganic groups representing ion bonding properties, and rating every organic compound as a point on a Cartesian coordinate system designated as an organic axis and an inorganic axis.

The inorganicity value is a value obtained by evaluating the magnitude of the influence of various substituents or bonds carried by an organic compound on the boiling point, and converting the magnitude into a numerical data based on the hydroxyl group. Specifically, when the distance between the boiling point curve of a linear alcohol and the boiling point curve of a linear paraffin is taken in the vicinity of a compound of five carbon atoms, the result is about 100° C. Thus, the influence of one hydroxyl group is defined as 100 as a numerical value, and the value obtained by converting the influence of various substituents or various bonds on the boiling point into a numerical value based on this value of 100, serves as the inorganicity value of the substituent carried by an organic compound. For example, the inorganicity value of a —COOH group is 150, and the inorganicity value of a double bond is 2. Therefore, the inorganicity value of an organic compound of a certain type means the sum of the inorganicity values of various substituents, bonds and the like carried by the compound.

The organicity value is defined by taking a methylene group in the molecule as a unit, and defining the influence of a carbon atom representing the methylene group on the boiling point as the reference. That is, when one carbon atom is added to a linear saturated hydrocarbon compound having around 5 to 10 carbon atoms, the average value of an increase in the boiling point is 20° C. Thus, the organicity value of one carbon atom is defined as 20 based on this value, and the value of converting the influence of various substituents or bonds on the boiling point based on this value of 20, serves as the organicity value. For example, the organicity value of a nitro group (—NO$_2$) is 70.

An I/O value approximating to zero represents that the organic compound is non-polar (hydrophobic, high organicity), and a larger value represents that the organic compound is polar (hydrophilic, high inorganicity).

According to the present invention, the I/O value of the first polymer means a value determined by the following method. The I/O value (=I value/O value) of each monomer constituting the first polymer is calculated based on the organicity (O value) and the inorganicity (I value) described in Koda Yoshio, "Organic Conceptual Diagram-Fundamentals and Applications" (1984), p. 13. For each of the monomers constituting the polymer, a product of the (I/O value) and (mol % in the polymer) was calculated, these products were summed, and the value obtained by rounding off at the third decimal place was defined as the I/O value of the first polymer.

As the method of calculating the inorganicity value of each monomer, generally a double bond is regarded as having an inorganicity of 2 upon addition; however, since the double bond disappears after polymerization, a value that does not add the portion of double bond as the inorganicity value of the monomers was used to calculate the I/O value of the first polymer used in the present invention.

According to exemplary embodiments of the invention, a polymer having a desired I/O value can be constructed by appropriately adjusting the structure and content of the monomers constituting the first polymer.

It is preferable that the first polymer according to exemplary embodiments of the invention has a glass transition temperature of from 120° C. to 250° C. and has an I/O value of from 0.20 to 0.55, from the viewpoints of the stability of the ink composition, the blocking resistance (particularly, under high temperature and high humidity conditions), and the scratch resistance of the images formed. It is more preferable that the glass transition temperature is from 150° C. to 250° C. and the I/O value is from 0.30 to 0.54, and it is even more preferable the glass transition temperature is from 160° C. to 200° C. and the I/O value is from 0.40 to 0.50.

The first polymer according to exemplary embodiments of the invention includes at least one hydrophilic structural unit derived from a hydrophilic monomer, and at least one hydrophobic structural unit derived from a hydrophobic monomer. The main chain skeleton of the first polymer is not particularly limited, but from the viewpoint of the dispersion stability of the polymer particles, the main chain skeleton is preferably a vinyl polymer, and preferably a (meth)acrylic polymer. Here, the (meth)acrylic polymer means a polymer including at least one of a structural unit derived from a methacrylic acid derivative and a structural unit derived from an acrylic acid derivative.

(Hydrophilic Structural Unit)

The hydrophilic structural unit is not particularly limited so long as it is derived from a hydrophilic group-containing monomer and it may be either a unit derived from one hydrophilic group-containing monomer (hydrophilic monomer) or a unit derived from two or more hydrophilic group-containing monomers. The hydrophilic group is not particularly limited and it may be either a dissociative group or a nonionic hydrophilic group.

In exemplary embodiments of the invention, the hydrophilic group is preferably a dissociative group from the viewpoints of promoting the self-dispersibility and stability of the formed emulsified or dispersed state and, more preferably, an anionic dissociative group. Examples of the dissociative group include a carboxy group, a phosphoric acid group, and a sulfonic acid group and, among them, a carboxy group is preferred from the viewpoint of the fixing property when used in the ink composition.

The hydrophilic group-containing monomer in exemplary embodiments of the invention is preferably a dissociative group-containing monomer and, preferably, a dissociative group-containing monomer having a dissociative group and an ethylenically unsaturated bond from the viewpoint of self-dispersibility.

Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-(methacryloyloxy)methyl succinicate, etc. Specific examples of the unsaturated sulfonic acid monomer include styrenesulfonic acid, 2-acrylamido-2-methylpropanesulfonic acid, 3-sulfopropyl(meth)acrylate, and bis(3-sulfopropyl)itaconate. Specific examples of the unsaturated phosphoric acid monomer include vinylphosphonic acid, vinylphosphate, bis(methacryloyloxyethyl)phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, an unsaturated carboxylic acid monomer is preferred and, at least one kind of acrylic acid and methacrylic acid is more preferred from the viewpoints of the dispersion stability and ejection stability.

Examples of the monomer having a nonionic hydrophilic group include ethylenically unsaturated monomers containing a (poly)ethyleneoxy group or a polypropyleneoxy group, such as 2-methoxyethyl acrylate, 2-(2-methoxyethoxy)ethyl acrylate, 2-(2-methoxyethoxy)ethyl methacrylate, ethoxytriethylene glycol methacrylate, methoxypolyethylene glycol (molecular weight 200 to 1000) monomethacrylate, and polyethylene glycol (molecular weight 200 to 1000) monomethacrylate; and ethylenically unsaturated monomers having a hydroxyl group, such as hydroxymethyl (meth)acrylate, 2-hydroxyethyl(meth)acrylate, 2-hydroxypropyl(meth)acrylate, 4-hydroxybutyl(meth)acrylate, and hydroxypentyl (meth)acrylate, hydroxyhexyl(meth)acrylate.

The monomer having a nonionic hydrophilic group is preferably an ethylenically unsaturated monomer having an alkyl ether at the end, rather than an ethylenically unsaturated monomer having a hydroxyl group at the end, from the viewpoints of the stability of the particles and the content of the water-soluble component.

The hydrophilic structural unit according to exemplary embodiments of the invention is preferably any of an embodiment containing only a hydrophilic structural unit having an anionic dissociative group, and an embodiment containing both a hydrophilic structural unit having an anionic dissociative group and a hydrophilic structural unit having a nonionic hydrophilic group.

Furthermore, an embodiment containing two or more types of hydrophilic structural units having an anionic dissociative group, or an embodiment having two or more of a hydrophilic structural unit having an anionic dissociative group and a hydrophilic structural unit having a nonionic hydrophilic group in combination, is also preferable.

The content of the hydrophilic structural unit in the self-dispersing polymer is preferably 25% by mass or less, more preferably from 1% by mass to 25% by mass, further preferably from 2% by mass to 23% by mass, and particularly preferably from 4% by mass to 20% by mass, from the viewpoints of viscosity and stability over time.

When the polymer has two or more types of hydrophilic structural units, it is preferable that the total content of the hydrophilic structural unit is within the range described above.

The content of the hydrophilic structural unit having an anionic dissociative group in the self-dispersing polymer is preferably in the range such that the acid value falls in the suitable range described below.

The content of the structural unit having a nonionic hydrophilic group is preferably from 0% by mass to 25% by mass, more preferably from 0% by mass to 20% by mass, and particularly preferably from 0% by mass to 15% by mass, from the viewpoints of ejection stability and stability over time.

When the self-dispersing polymer has an anionic dissociative group, the acid value is preferably 20 mgKOH/g to 200 mgKOH/g, more preferably 22 mgKOH/g to 120 mgKOH/g, and even more preferably 25 mgKOH/g to 100 mgKOH/g, from the viewpoint of self-dispersibility, content of the water-soluble component, and fixation properties when the polymer constitutes an ink composition. The acid value is particularly preferably 30 mgKOH/g to 80 mgKOH/g. When the acid value is 20 mgKOH/g or greater, the particles can be dispersed more stably, and when the acid value is 200 mgKOH/g or less, the content of the water-soluble component can be reduced.

(Hydrophobic Structural Unit)

The hydrophobic structural unit according to exemplary embodiments of the invention is not particularly limited so long as it is derived from a hydrophobic group-containing monomer (hydrophobic monomer), and may be a structural unit derived from a monomer containing one type of hydrophobic group, or may be a structural unit derived from a monomer containing two or more types of hydrophobic groups. The hydrophobic group is not particularly limited, and may be any of a chain-like aliphatic group, a cyclic aliphatic group, and an aromatic group.

The hydrophobic monomer according to exemplary embodiments of the invention is preferably such that at least one is a cyclic aliphatic group-containing monomer, and more preferably a cyclic aliphatic group-containing (meth)acrylate (hereinafter, may be referred to as "alicyclic (meth)acrylate"), from the viewpoints of blocking resistance, scratch resistance and dispersion stability.

—Alicyclic(meth)acrylate—

The alicyclic(meth)acrylate according to exemplary embodiments of the invention is a compound including a structural site derived from (meth)acrylic acid and a structural site derived from alcohol, and having a structure containing at least one unsubstituted or substituted alicyclic hydrocarbon group (cyclic aliphatic group) in the structural site derived from alcohol. The alicyclic hydrocarbon group may be the structural site derived from alcohol itself, or may be linked to the structural site derived from alcohol via a linking group.

The "alicyclic(meth)acrylate" means a methacrylate or acrylate having an alicyclic hydrocarbon group.

The alicyclic hydrocarbon group is not particularly limited so long as it contains a cyclic non-aromatic hydrocarbon group, and may be a monocyclic hydrocarbon group, a bicyclic hydrocarbon group, or a polycyclic hydrocarbon group having three or more rings.

Examples of the alicyclic hydrocarbon group include a cycloalkyl group such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricyclo[5.2.1.0$^{2,6}$]decanyl group, a bicyclo[4.3.0]nonane, and the like.

The alicyclic hydrocarbon group may be further substituted with a substituent. Examples of the substituent include an alkyl group, an alkenyl group, an aryl group, an aralkyl group, an alkoxy group, a hydroxyl group, a primary amino group, a secondary amino group, a tertiary amino group, an alkyl- or arylcarbonyl group, a cyano group, and the like.

The alicyclic hydrocarbon group may further form a condensed ring.

The alicyclic hydrocarbon group according to exemplary embodiments of the invention preferably has 5 to 20 carbon atoms in the alicyclic hydrocarbon group moiety, from the viewpoint of viscosity or solubility.

The linking group that links the alicyclic hydrocarbon group and the structural site derived from alcohol may be suitably an alkylene group, an alkenylene group, an alkynylene group, an arylalkylene group, an alkylenoxy group, a mono- or oligoethylenoxy group, a mono- or oligopropylenoxyl group, or the like, having 1 to 20 carbon atoms.

Specific examples of the alicyclic alkyl(meth)acrylate according to exemplary embodiments of the invention will be shown below, but the invention is not limited to these.

Examples of monocycloalkyl(meth)acrylate include cycloalkyl(meth)acrylates having a cycloalkyl group having 3 to 10 carbon atoms, such as cyclopropyl(meth)acrylate, cyclobutyl(meth)acrylate, cyclopentyl(meth)acrylate, cyclohexyl(meth)acrylate, cycloheptyl(meth)acrylate, cyclooctyl(meth)acrylate, cyclononyl(meth)acrylate, and cyclodecyl(meth)acrylate.

Examples of bicycloalkyl(meth)acrylate include isobornyl(meth)acrylate, norbornyl(meth)acrylate, and the like.

Examples of tricycloalkyl(meth)acrylate include adamantyl(meth)acrylate, dicyclopentanyl(meth)acrylate, dicyclopentenyloxyethyl(meth)acrylate, and the like.

These can be used individually, or as mixtures of two or more types.

Among these, at least one of the bicycloalkyl(meth)acrylate and the polycycloalkyl(meth)acrylate having three or more rings is preferable, and at least one selected from isobornyl(meth)acrylate, adamantyl(meth)acrylate and dicyclopentanyl(meth)acrylate is more preferable, from the viewpoints of the dispersion stability, fixability and blocking resistance of the self-dispersing polymer particles.

According to exemplary embodiments of the invention, the content of the structural unit derived from alicyclic alkyl (meth)acrylate contained in the self-dispersing polymer particles is preferably 20% by mass to 90% by mass, more preferably 40% by mass to 90% by mass, and particularly preferably 50% by mass to 80% by mass, from the viewpoints of the stability of the self-dispersed state, stabilization of particle shape in an aqueous medium due to the hydrophobic interaction between the alicyclic hydrocarbon groups, and a decrease in the amount of the water-soluble component due to an appropriate hydrophobization of particles.

When the content of the structural unit derived from alicyclic(meth)acrylate is 20% by mass or more, fixation properties and blocking can be improved. On the other hand, when the content of the structural unit derived from alicyclic(meth)acrylate is 90% by mass or less, the stability of the polymer particles is improved.

The self dispersing polymer according to exemplary embodiments of the invention can be constituted to further include another structural unit as the hydrophobic structural unit if necessary, in addition to the structural unit derived from alicyclic(meth)acrylate. The monomer forming the other structural unit is not particularly limited so long as it is a monomer capable of copolymerizing with the alicyclic (meth)acrylate and the hydrophilic group-containing monomer, and any known monomer can be used.

Specific examples of the monomer forming the other structural unit (hereinafter, may be referred to as "other copolymerizable monomer") include alkyl(meth)acrylates such as methyl(meth)acrylate, ethyl(meth)acrylate, isopropyl(meth)acrylate, n-propyl(meth)acrylate, n-butyl(meth)acrylate, isobutyl(meth)acrylate, t-butyl(meth)acrylate, hexyl(meth)acrylate, and ethylhexyl(meth)acrylate; aromatic ring-containing (meth)acrylates such as benzyl(meth)acrylate and phenoxyethyl(meth)acrylate; stryrenes such as styrene, α-methylstyrene, and chlorostyrene; dialkylaminoalkyl (meth)acrylates such as dimethylaminoethyl(meth)acrylate; N-hydroxyalkyl(meth)acrylamides such as N-hydroxymethyl(meth)acrylamide, N-hydroxyethyl(meth)acrylamide, and N-hydroxybutyl(meth)acrylamide; N-alkoxyalkyl(meth)acrylamides such as N-methoxymethyl(meth)acrylamide, N-ethoxymethyl(meth)acrylamide, N-(n-, iso-)butoxymethyl(meth)acrylamide, N-methoxyethyl(meth)acrylamide, N-ethoxyethyl(meth)acrylamide, and N-(n-, iso-)butoxyethyl(meth)acrylamide; and the like.

Among them, the other structural unit is preferably at least one (meth)acrylate containing a chain-like alkyl group having 1 to 8 carbon atoms, from the viewpoint of the flexibility of the polymer skeleton or the ease of control of the glass transition temperature (Tg) and from the viewpoint of the dispersion stability of the self-dispersing polymer, and is more preferably a (meth)acrylate having a chain-like alkyl group having 1 to 4 carbon atoms, and particularly preferably methyl(meth)acrylate or ethyl(meth)acrylate. Here, the chain-like alkyl group refers to an alkyl group having a linear or branched chain.

According to exemplary embodiments of the invention, a (meth)acrylate containing an aromatic group can also be preferably used.

When an aromatic-containing (meth)acrylate is contained as the other copolymerizable monomer, the content of the structural unit derived from the aromatic-containing (meth)acrylate is preferably 40% by mass or less, more preferably 30% by mass or less, and particularly preferably 20% by mass or less, from the viewpoint of the dispersion stability of the self-dispersing polymer particles.

Furthermore, when a styrene-type monomer is used as the other copolymerizable monomer, the content of the structural unit derived from the styrene-type monomer is preferably 20% by mass or less, more preferably 10% by mass or less, and further preferably 5% by mass or less, from the viewpoint of stability when the self-dispersing polymer is made into particles, and it is particularly preferable that the polymer does not include a structural unit derived from a styrene-type monomer.

Here, the styrene-type monomer refers to styrene, substituted styrene ($\alpha$-methylstyrene, chlorostyrene, or the like), or a styrene macromer having a polystyrene structural unit.

The other copolymerizable monomer according to exemplary embodiments of the invention may be used individually, or in combination of two or more types.

When the first polymer includes the other structural unit, the content is preferably from 10% by mass to 80% by mass, more preferably from 15% by mass to 75% by mass, and particularly preferably from 20% by mass to 70% by mass. When two or more types of the monomer forming the other structural unit are used in combination, the total content is preferably in the range mentioned above.

The first polymer according to exemplary embodiments of the invention is preferably a polymer obtainable by polymerizing at least three types of an alicyclic(meth)acrylate, another copolymerizable monomer and a hydrophilic group-containing monomer, and more preferably a polymer obtainable by polymerizing at least three types of an alicyclic(meth)acrylate, an alkyl group-containing (meth)acrylate having a linear or branched chain having 1 to 8 carbon atoms, and a hydrophilic group-containing monomer, from the viewpoint of dispersion stability.

According to exemplary embodiments of the invention, it is preferable that the content of the (meth)acrylate having a linear or branched alkyl group having 9 or more carbon atoms, and the structural unit having a substituent with high hydrophobicity, which is derived from an aromatic group-containing macromonomer or the like, is substantially none, and it is more preferable that the polymer does not include any of the structural units at all, from the viewpoint of dispersion stability.

The first polymer according to exemplary embodiments of the invention may be a random copolymer having the respective structural units introduced irregularly, or may be a block copolymer having the respective structural units introduced regularly. If the first polymer is a block copolymer, the respective structural units may be synthesized in a certain order of introduction, or the same constituent component may be used two or more times. However, it is preferable that the first polymer is a random copolymer, from the viewpoints of all-purpose usability and manufacturability.

The range of molecular weight of the first polymer according to exemplary embodiments of the invention is preferably from 3000 to 200,000, more preferably from 10,000 to 200,000, and further preferably from 30,000 to 150,000, in terms of weight average molecular weight. When the weight average molecular weight is 3,000 or more, the amount of the water-soluble component can be effectively suppressed. When the weight average molecular weight is 200,000 or less, the self-dispersion stability can be enhanced.

Here, the weight average molecular weight can be measured by gel permeation chromatography (GPC).

From the viewpoint of controlling the hydrophilicity and hydrophobicity of the polymer, the first polymer according to exemplary embodiments of the invention is preferably a vinyl polymer which includes a structure derived from an alicyclic (meth)acrylate at a copolymerization ratio of 20% by mass to 90% by mass, and at least one of a structure derived from a dissociative group-containing monomer and a structure derived from a (meth)acrylate containing a chain-like alkyl group having 1 to 8 carbon atoms, and has an acid value of from 20 to 120, a total content of the hydrophilic structural units of 25% by mass or less, and a weight average molecular weight of from 3,000 to 200,000.

The first polymer is more preferably a vinyl polymer which includes a structure derived from a bicyclic(meth)acrylate or a polycyclic(meth)acrylate having three or more rings at a copolymerization ratio of 20% by mass or more and less than 90% by mass, and a structure derived from a (meth)acrylate containing a chain-like alkyl group having 1 to 4 carbon atoms at a copolymerization ratio of 10% by mass or more and less than 80% by mass, and a structure derived from a carboxy group-containing monomer at an acid value in the range of 25 to 100, and has a total content of the hydrophilic structural unit of 25% by mass or less, and a weight average molecular weight of from 10,000 to 200,000.

Furthermore, the first polymer is particularly preferably a vinyl polymer which includes a structure derived from a bicyclic(meth)acrylate or a polycyclic(meth)acrylate having three or more rings at a copolymerization ratio of 40% by mass or more and less than 80% by mass, and at least a structure derived from methyl(meth)acrylate or ethyl(meth)acrylate at a copolymerization ratio of 20% by mass or more and less than 60% by mass, and a structure derived from acrylic acid or methacrylic acid at an acid value in the range of 30 to 80, and has a total content of the hydrophilic structural unit of 25% by mass or less, and a weight average molecular weight of from 30,000 to 150,000.

Hereinafter, specific examples of the self-dispersing polymer will be listed as exemplary compounds, but the present invention is not limited to these. The numbers in the parentheses represent the mass ratio of the copolymerized components.

Methyl methacrylate/isobornyl methacrylate/methacrylic acid copolymer (20/72/8), glass transition temperature: 180° C., I/O value: 0.44

Methyl methacrylate/isobornyl methacrylate/methacrylic acid copolymer (40/52/8), glass transition temperature: 160° C., I/O value: 0.50

Methyl methacrylate/isobornyl methacrylate/methacrylic acid copolymer (50/44/6), glass transition temperature: 140° C., I/O value: 0.51

Methyl methacrylate/isobornyl methacrylate/methacrylic acid copolymer (85/7/8), glass transition temperature: 120° C., I/O value: 0.67

Methyl methacrylate/benzyl methacrylate/methacrylic acid copolymer (85/7/8), glass transition temperature: 100° C., I/O value: 0.67

Methyl methacrylate/dicyclopentanyl methacrylate/methacrylic acid copolymer (20/72/8), glass transition temperature: 160° C., I/O value: 0.47

Methyl methacrylate/isobornyl methacrylate/dicyclopentanyl methacrylate/methacrylic acid copolymer (20/62/10/8), glass transition temperature: 170° C., I/O value: 0.44

For the calculation of the I/O value, the following values were used as the I/O values of the monomers constituting the polymer.

Methyl methacrylate: 0.60, isobornyl methacrylate: 0.29, dicyclopentanyl methacrylate: 0.32, methacrylic acid 0.47.

The method for producing a self-dispersing polymer according to exemplary embodiments of the invention is not particularly limited, and the polymer can be produced by copolymerizing a monomer mixture according to a known polymerization method. Among such polymerization methods, it is more preferable to perform polymerization in an organic solvent from the viewpoint of droplet ejection properties when formed into an ink composition, and a solution polymerization method is particularly preferable.

In regard to the method for producing the self-dispersing polymer of exemplary embodiments of the invention, the water-insoluble polymer as described above can be produced by subjecting a mixture including a monomer mixture and if necessary, an organic solvent and a radical polymerization initiator, to a copolymerization reaction under an inert gas atmosphere.

The method for producing an aqueous dispersion of self-dispersing polymer particles according to the invention is not particularly limited, and an aqueous dispersion of self-dispersing polymer particles can be obtained by a known method. The process of obtaining a self-dispersing polymer as an aqueous dispersion is preferably a phase inversion emulsification method including the following process (1) and process (2).

Process (1): a process of obtaining a dispersion by stirring a mixture containing a water-insoluble polymer, an organic solvent, a neutralizing agent and an aqueous medium.

Process (2): a process of removing at least a portion of the organic solvent from the dispersion.

The process (1) is preferably a treatment of first dissolving the water-insoluble polymer in an organic solvent, slowly adding a neutralizing agent and an aqueous medium thereto, and mixing and stirring the mixture to obtain a dispersion. As such, when a neutralizing agent and an aqueous medium are added into a solution of the water-insoluble polymer dissolved in an organic solvent, a self-dispersing polymer particle having a particle size with higher storage stability can be obtained without requiring a strong shear force.

The method of stirring the mixture is not particularly limited, and any generally used mixing and stirring apparatus, or if necessary, a dispersing machine such as an ultrasonic dispersing machine or a high pressure homogenizer can be used.

Preferable examples of the organic solvent include alcohol-based solvents, ketone-based solvents, and ether-based solvents.

Examples of the alcohol-based solvents include isopropyl alcohol, n-butanol, t-butanol, ethanol and the like. Examples of the ketone-based solvents include acetone, methyl ethyl ketone, diethyl ketone, methyl isobutyl ketone, and the like. Examples of the ether-based solvents include dibutyl ether, dioxane, and the like. Among these organic solvents, ketone-based solvents such as methyl ethyl ketone and alcohol-based solvents such as isopropyl alcohol are preferred.

It is also preferable to use isopropyl alcohol and methyl ethyl ketone in combination. When the solvents are used in combination, aggregation/precipitation or fusion between particles does not occur, and a self-dispersing polymer particle having a microparticle size with high dispersion stability can be obtained. This is thought to be because the polarity change upon phase inversion from an oil system to an aqueous system becomes mild.

The neutralizing agent is used to partially or entirely neutralize the dissociative groups so that the self-dispersing polymer can form a stable emulsified or dispersed state in water. In the case where the self-dispersing polymer of exemplary embodiments of the invention has an anionic dissociative group as the dissociative group, examples of the neutralizing agent to be used include basic compounds such as organic amine compounds, ammonia, and alkali metal hydroxides. Examples of the organic amine compounds include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-diethylamino-2-methyl-1-propanol, 2-amino-2-methyl-1-propanol, N-methyldiethanolamine, N-ethyldiethanolamine, monoisopropanolamine, diisopropanolamine, and triisopropanolamine, etc. Examples of the alkali metal hydroxide include lithium hydroxide, sodium hydroxide and potassium hydroxide. Among them, sodium hydroxide, potassium hydroxide, triethylamine, and triethanolamine are preferred from the viewpoint of the stabilization of dispersion of the self-dispersing polymer particles of exemplary embodiments of the invention into water.

These basic compounds are preferably used in an amount of from 5 mol % to 120 mol %, more preferably from 20 mol % to 100 mol %, and further preferably from 30 mol % to 80 mol %, based on 100 mol % of the dissociative group. When the content is 15 mol % or more, an effect of stabilizing the dispersion of particles in water is exhibited, and when the content is 80 mol % or less, an effect of reducing water-soluble components is obtained.

In the process (2), an aqueous dispersion of self-dispersing polymer particles can be obtained by distilling off the organic solvent from the dispersion obtained in the process (1) by a conventional method such as distillation under reduced pressure, to thereby bring about phase inversion into an aqueous system. The organic solvent in the obtained aqueous dispersion is substantially removed, and the amount of the organic solvent is preferably 0.2% by mass or less, and more preferably 0.1% by mass or less.

The average particle size of the self-dispersing polymer particles according to exemplary embodiments of the invention is preferably in the range of 1 nm to 100 nm, more preferably 3 nm to 80 nm, and further preferably 5 nm to 60 nm. The average particle size is particularly preferably from 5 nm to 40 nm. With an average particle size of 1 nm or more, manufacturability is enhanced. Further, with an average particle size of 100 nm or less, storage stability is enhanced.

The particle size distribution of the self-dispersing polymer particles is not particularly limited, and the polymer particles may have a broad particle size distribution or a mono-dispersed particle size distribution. Water-insoluble particles may also be used as mixtures of two or more types.

The average particle size and particle size distribution of the self-dispersing polymer particles can be measured using, for example, a light scattering method.

In the ink composition of exemplary embodiments of the invention, the self-dispersing polymer particles preferably exist in a form that does not substantially contain a colorant.

The self-dispersing polymer particles of exemplary embodiments of the invention have excellent self-dispersibility, and the stability of a dispersion of the polymer alone is very high. However, for example, since the function as a so-called dispersant for stably dispersing a pigment is not very significant, if the self-dispersing polymer according to exemplary embodiments of the invention is present in the ink composition in a form containing a pigment, consequently the stability of the ink composition as a whole may be greatly decreased.

The ink composition for inkjet recording of the present invention may contain one type of self-dispersing polymer particles alone, or may contain two or more types of such particles.

The content of the self-dispersing polymer particles in the ink composition in exemplary embodiments of the invention is preferably from 1% by mass to 30% by mass, more preferably from 2% by mass to 20% by mass, and particularly preferably from 2% by mass to 10% by mass, based on the ink composition for inkjet recording, from the viewpoint of the glossiness of images.

Moreover, the content ratio of the colloidal silica with respect to the self-dispersing polymer particles (colloidal silica/self-dispersing polymer particles) in the ink composition of exemplary embodiments of the invention is preferably from 0.0001 to 0.1 on the basis of mass, and more preferably from 0.001 to 0.05.

When the content ratio of the colloidal silica with respect to the self-dispersing polymer particles is 0.0001 or higher, the lowering of liquid repellency of the inkjet head member is more effectively suppressed. Further, when the content ratio is 0.1 or lower, the dischargeability is further enhanced.

In the ink composition of exemplary embodiments of the invention, from the viewpoints of the ink dischargeability, ink stability, and suppression of the lowering of liquid repellency of the inkjet head member, it is preferable that the ink composition contains self-dispersing polymer particles having an acid value of from 20 to 200 and colloidal silica having a volume average particle diameter of from 3 nm to 50 nm, and the content ratio thereof (colloidal silica/self-dispersing polymer particles) is from 0.0001 to 0.1 on the basis of mass. It is more preferable that the ink composition contains self-dispersing polymer particles having an acid value of from 22 to 120 and colloidal silica having a volume average particle diameter of from 3 nm to 25 nm, and the content ratio thereof is from 0.001 to 0.05.

[Colorant Particles]

The ink composition for inkjet recording of exemplary embodiments of the invention contains at least one type of colorant particles.

It is enough that the colorant particles have a function of forming images by coloring, and any of a water-insoluble dye, colored fine particles, a water-dispersible pigment, or the like can be used. In the present invention, water-dispersible pigment is preferable from the viewpoints of lightfastness and the like.

Specific examples of the water-dispersible pigment include the following pigments (1) to (4).

(1) An encapsulated pigment, specifically, a polymer emulsion prepared by adding a pigment to polymer particles, and more specifically, a water dispersion of a pigment prepared through coating the pigment with a water-insoluble polymer dispersant in order to impart hydrophilicity by a polymer layer on the surface of the pigment.

(2) A self-dispersing type pigment, specifically, a pigment which has at least one type of hydrophilic group on its surface and exhibits water dispersibility in the absence of a dispersant, and more specifically, mainly carbon black or the like, which has been subjected to a surface oxidation treatment in order to impart hydrophilicity so that the pigment alone is dispersed in water.

(3) A resin-dispersible pigment, specifically, a pigment that is dispersed by using a water-soluble polymer having a weight average molecular weight of 50,000 or less.

(4) A surfactant-dispersible pigment, specifically, a pigment that is dispersed by using a surfactant.

In the present invention, (1) an encapsulated pigment and (2) a self-dispersing type pigment are described as preferable examples, and (1) an encapsulated pigment is described as a particularly preferable example.

(Encapsulated Pigment)

The pigment is not particularly limited in the type, and conventionally known organic and inorganic pigments can be used. Specifically, the pigments described in JP-A No. 2007-100071 and the like may be mentioned, and particularly, azo pigments, phthalocyanine pigments, anthraquinone pigments, quinacridone pigments, and carbon black-based pigments are preferably used.

The water-insoluble polymer dispersant (hereinafter, may be simply referred to as "dispersant") is not particularly limited so long as it is a water-insoluble polymer (hereinafter, may be referred to as "second polymer") and is capable of dispersing a pigment, and conventionally known water-insoluble polymer dispersants can be used. The water-insoluble polymer dispersant can be constituted to include both a hydrophobic structural unit and a hydrophilic structural unit.

The monomer constituting the hydrophobic structural unit may be a styrene-type monomer, an alkyl (meth)acrylate, an aromatic group-containing (meth)acrylate, or the like.

The monomer constituting the hydrophilic structural unit is not particularly limited so long as it is a monomer containing a hydrophilic group. The hydrophilic group may be a nonionic group, a carboxy group, a sulfonate group, a phosphonate group, or the like. The nonionic group has the same meaning as the nonionic group for the self-dispersing polymer that will be described later.

The hydrophilic structural unit according to exemplary embodiments of the invention preferably contains at least a carboxy group from the viewpoint of dispersion stability, and a form containing both a nonionic group and a carboxy group is also preferable.

Specific examples of the water-insoluble polymer dispersant according to exemplary embodiments of the invention include styrene-(meth)acrylic acid copolymers, styrene-(meth)acrylic acid-(meth)acrylic acid ester copolymers, (meth)acrylic acid ester-(meth)acrylic acid copolymers, polyethylene glycol(meth)acrylate-(meth)acrylic acid copolymers, styrene-maleic acid copolymers, and the like.

Here, the term "(meth)acrylic acid" means acrylic acid or methacrylic acid.

The water-insoluble polymer dispersant according to exemplary embodiments of the invention is preferably a vinyl polymer containing a carboxy group, and is more preferably a vinyl polymer having at least a structural unit derived from an aromatic group-containing monomer as the hydrophobic structural unit, and a structural unit containing a carboxy group as the hydrophobic structural unit, from the viewpoint of the dispersion stability of the pigment.

The weight average molecular weight of the water-insoluble polymer dispersant is preferably from 3,000 to 200,000, more preferably from 5,000 to 100,000, further preferably from 5,000 to 80,000, and particularly preferably from 10,000 to 60,000, from the viewpoint of the dispersion stability of the pigment.

The content of the dispersant in the encapsulated pigments according to exemplary embodiments of the invention is preferably from 5% by mass to 200% by mass, in terms of the dispersant, more preferably from 10% by mass to 100% by mass, and particularly preferably from 20% by mass to 80% by mass, based on the pigment, from the viewpoint of the dispersibility of the pigment, ink coloring properties and dispersion stability.

When the content of the dispersant in the encapsulated pigments is in the range mentioned above, the pigment is coated with an appropriate amount of the dispersant, and thus there is a tendency that encapsulated pigments having a small particle size and excellent stability over time are easily obtained, which is preferable.

The encapsulated pigments according to exemplary embodiments of the invention may contain another dispersant, in addition to the water-insoluble polymer dispersant. For example, a conventionally known water-soluble low molecular weight dispersant or water-soluble polymer or the like can be used. The content of the dispersant other than the water-insoluble polymer dispersant can be used in the range of the content of the dispersant mentioned above.

The encapsulated pigments can be added with other additives such as a basic substance (neutralizing agent), a surfactant and the like, as necessary.

As for the basic substance, a neutralizing agent (organic base, inorganic alkali) can be used. It is preferable that the basic substance is added such that the composition containing the dispersant is adjusted to pH 7 to 11, for the purpose of neutralizing the dispersant, and it is more preferable that the basic substance is added to adjust the composition to pH 8 to 10.

The content of the basic substance is preferably from 50 to 150 mol %, more preferably from 70 to 120 mol %, and particularly preferably from 80 to 100 mol %, based on 100 mol % of the ionic group in the dispersant.

Specific examples of the basic substance are the same as those mentioned for the self-dispersing polymer particles.

(Method for Producing Particle Dispersion of Color Material)

The encapsulated pigments according to exemplary embodiments of the invention can be obtained as a encapsulated pigment dispersion, by dispersing a mixture containing, for example, a pigment, a dispersant, a solvent if necessary (preferably, an organic solvent) and the like, using a dispersing machine.

The particle dispersion of color material (colorant particle dispersion) according to exemplary embodiments of the invention includes a pigment, a dispersant, an organic solvent which dissolves or disperses the dispersant, and a basic substance, and is preferably produced by mixing a solution containing water as a main component (mixing and hydration process), and then excluding the organic solvent (solvent removal process).

According to this method for producing a colorant particle dispersion, the encapsulated pigments are finely dispersed, and thus a colorant particle dispersion having excellent storage stability can be produced.

The organic solvent in the method for producing a colorant particle dispersion needs to be able to dissolve or disperse the dispersant according to exemplary embodiments of the invention, but in addition to this, it is preferable that the solvent has a certain degree of affinity to water. Specifically, the solubility in water is preferably 10% by mass or more and 50% by mass or less at 20° C.

The colorant particle dispersion according to exemplary embodiments of the invention can be produced more particularly by a production method including a process (1) and a process (2) shown below, but the method is not limited to this.

Process (1): a process of dispersion treating a mixture containing a pigment, a dispersant, an organic solvent which dissolves or disperses the dispersant, as well as a basic substance and water.

Process (2): a process of removing at least a portion of the organic solvent from the mixture after the dispersion treatment.

In the process (1), first, the dispersant is dissolved or dispersed in the organic solvent, to obtain such a mixture (mixing process). Subsequently, a solution containing a pigment and a basic substance and containing water as a main component, as well as water and if necessary, a surfactant or the like, are added to the mixture, and the mixture is mixed and dispersed, to obtain an oil-in-water type colorant particle dispersion.

The amount of addition of the basic substance (degree of neutralization) is not particularly limited. Usually, it is preferable that the liquid properties of the finally obtained encapsulated pigment dispersion are liquid properties close to neutrality, that is, for example, pH (25° C.) is 4.5 to 10. The pH can be determined by the degree of neutralization in accordance with the dispersant.

The pigment, dispersant and other additives used in the method for producing the colorant particle dispersion are the same as those described in the section for colorant particles, and so are the preferable examples.

Preferable examples of the organic solvent used in exemplary embodiments of the invention include alcohol-based solvents, ketone-based solvents, and ether-based solvents. Among these, examples of the alcohol-based solvents include ethanol, isopropanol, n-butanol, tertiary butanol, isobutanol, diacetone alcohol, and the like. Examples of the ketone-based solvents include acetone, methyl ethyl ketone, diethyl ketone, methyl isobutyl ketone, and the like. Examples of the ether-based solvents include dibutyl ether, tetrahydrofuran, dioxane, and the like. Among these solvents, isopropanol, acetone and methyl ethyl ketone are preferable, and particularly, methyl ethyl ketone is preferable.

These organic solvents may be used individually, or in combination of several types.

In the production of the colorant particle dispersion, the kneading dispersion treatment can be carried out using a double roll, a triple roll, a ball mill, a throne mill, a Disper, a kneader, a co-kneader, a homogenizer, a blender, a single-screw or twin-screw extruder, or the like, while applying a strong shear force.

In addition, the details of the kneading and dispersion are described in T. C. Patton, "Paint flow and Pigment Dispersion" (1964, published by John Wiley and Sons, Inc.), and the like.

If necessary, the colorant particle dispersion can be subjected to a fine dispersion treatment with beads having a particle size of from 0.01 mm to 1 mm and formed from glass, zirconium oxide or the like, using a vertical type or horizontal type sand grinder, a pin mill, a slit mill, an ultrasonic disperser or the like.

In the method for producing a colorant particle dispersion according to exemplary embodiments of the invention, the removal of the organic solvent is not particularly limited, and the solvent can be removed by a known method such as distillation under reduced pressure.

The encapsulated pigments in the colorant particle dispersion thus obtained maintain a good dispersed state, and the obtained colorant particle dispersion has excellent stability over time.

(Self-Dispersing Type Pigment)

A self-dispersing type pigment is a pigment whose surface is bonded with many hydrophilic functional groups and/or salts thereof (hereinafter, referred to as "dispersibility imparting groups") directly or indirectly through an alkyl group, an alkyl ether group, an aryl group, or the like, and is a pigment that is dispersible in an aqueous medium without using a dispersant. Herein, the expression "dispersible in an aqueous medium without using a dispersant" refers to a state of being possible to be dispersed in an aqueous medium without using a dispersant for dispersing the pigment.

Since an ink including the self-dispersing type pigment as a colorant does not need to further include such a dispersant that is included for dispersing general pigments as described above, an ink having excellent ejection stability is easily prepared, in which foaming caused by lowering of antifoaming property due to the dispersant hardly occurs.

In the present invention, self-dispersing type pigments, which have been subjected to a surface treatment by an oxidation treatment using hypohalogenous acid and/or hypohalogenite or by an oxidation treatment using ozone, are described as preferable examples. It is possible to utilize commercially available products as the self-dispersing type pigment. Examples of the commercially available products include MICROJET CW-1 (trade name, manufactured by Orient Chemical Co., Ltd.) and CAB-O-JET 200 and CAB-O-JET 300 (all trade names, manufactured by Cabot Oil & Gas Corp.).

According to exemplary embodiments of the invention, the average particle size of the colorant particles is preferably from 10 nm to 200 nm, more preferably from 10 nm to 150 nm, and further preferably from 10 nm to 100 nm. When the average particle size is 200 nm or less, the color reproducibility is satisfactory, and in the case of inkjet method, the droplet ejection properties are good. Furthermore, when the average particle size is 10 nm or more, lightfastness is satisfactory.

The particle size distribution of the colorant particles is not particularly limited, and may be any of a broad particle size distribution and a monodisperse particle size distribution. Two or more types of colorant particles having a monodisperse particle size distribution may also be used as a mixture.

The average particle size and particle size distribution of the colorant particles can be measured, for example, using a dynamic light scattering method.

In the ink composition of exemplary embodiments of the invention, one type of the colorant particles may be used individually, or two or more types of the colorant particles may be used in combination.

The content of the colorant particles in the ink composition is preferably from 0.1% by mass to 25% by mass, more preferably from 1% by mass to 20% by mass, further preferably from 1.5% by mass to 15% by mass, and particularly preferably from 1.5% by mass to 10% by mass, based on the ink composition, from the viewpoint of image density.

Further, a content ratio of the colorant particles to the self-dispersing polymer particles (colorant particles/self-dispersing polymer particles) is preferably from 1/0.5 to 1/10, and more preferably from 1/1 to 1/4 from the viewpoints of scratch resistance of images and the like.

[Hydrophilic Organic Solvent]

The ink composition for inkjet recording of exemplary embodiments of the invention preferably includes a water-based medium. The water-based medium contains at least water as a solvent, but preferably contains water and at least one hydrophilic organic solvent. The hydrophilic organic solvent is used for the purpose of an anti-drying agent, a wetting agent, or a penetration promoting agent.

An anti-drying agent or a wetting agent is used for the purpose of preventing the clogging caused as the ink for inkjet recording dries up at the ink spray orifice of a nozzle. The anti-drying agent or wetting agent is preferably a hydrophilic organic solvent having a lower vapor pressure than water.

Furthermore, for the purpose of making the ink composition for inkjet recording penetrate easily into paper, a hydrophilic organic solvent is suitably used as a penetration promoting agent.

The ink composition for inkjet recording of exemplary embodiments of the invention preferably includes at least one type of a first hydrophilic organic solvent having an I/O value of from 0.70 to less than 1.0. When the I/O value of the first hydrophilic organic solvent is less than 1.00, compatibility with the self-dispersing polymer particles is enhanced, the fixability of the images formed is more effectively enhanced, and the scratch resistance of the images is further enhanced. When the I/O value of the first hydrophilic organic solvent is 0.70 or more, the stability of the ink composition is enhanced.

The I/O value of the hydrophilic organic solvent is calculated in the same manner as in the calculation of the I/O value for the first polymer.

It is preferable that the ink composition for inkjet recording of exemplary embodiments of the invention further includes at least one of a second hydrophilic organic solvent having an I/O value of 1.00 to 1.50, in addition to the first hydrophilic organic solvent. When the I/O value of the second hydrophilic organic solvent is 1.00 or more, the stability of the ink composition is more effectively enhanced. When the I/O value of the second hydrophilic organic solvent is 1.50 or less, deterioration of the fixation properties of the formed images can be suppressed.

Specific examples of the first hydrophilic organic solvent having an I/O value of 0.70 or more and less than 1.00 include glycol ethers. Propylene glycol ether or ethylene glycol ether is preferable, and propylene glycol ether is more preferable. Specific examples include triprolene glycol monomethyl ether (I/O value: 0.80), triprolene glycol monoethyl ether (I/O value: 0.73), triprolene glycol monobutyl ether (I/O value: 0.61), diprolene glycol monoethyl ether (I/O value: 0.78), diprolene glycol monobutyl ether (I/O value: 0.70), and prolene glycol monobutyl ether (I/O value: 0.88).

Among these, triprolene glycol monomethyl ether (I/O value: 0.80) is preferable from the viewpoints of image fixability and ink stability.

Specific examples of the second hydrophilic organic solvent having an I/O value of 1.0 to 1.5, include propylene glycol monomethyl ether (I/O value: 1.50), propylene glycol monoethyl ether (I/O value: 1.20), diethylene glycol monobutyl ether (I/O value: 1.40), triethylene glycol monobutyl ether (I/O value: 1.20), 2,2-diethyl-1,3-propanediol (I/O value: 1.43), 2-methyl-2-propyl-1,3-propanediol (I/O value: 1.43), 2,4-dimethyl-2,4-pentanediol (I/O value: 1.43), 2,5-dimethyl-2,5-hexanediol (I/O value: 1.25), tripropylene glycol (I/O value: 1.33), SANNIX GP250 (trade name, I/O value: 1.30, manufactured by Sanyo Chemical Industries, Ltd.), and the like. Among them, SANNIX GP250 is preferable from the viewpoints of image fix properties and ink stability.

The content of the first hydrophilic organic solvent in the ink composition for inkjet recording of exemplary embodiments of the invention is preferably 0.1% by mass to 20% by mass, more preferably 1% by mass to 16% by mass, and further preferably 2% by mass to 12% by mass, from the viewpoints of image fix properties and ink stability.

Furthermore, it is preferable that the ink composition includes, as the first hydrophilic organic solvent, a hydrophilic organic solvent whose I/O value is selected from the range of 0.70 or more and less than 1.00, in an amount of 1 to 16% by mass, and it is more preferable that the ink composition includes a hydrophilic organic solvent whose I/O value is selected from the range of 0.70 or more and less than 0.90, in an amount of 2% by mass to 12% by mass.

The content of the second hydrophilic organic solvent in the ink composition for inkjet recording in exemplary embodiments of the invention is preferably 0.1% by mass to 20% by mass, more preferably 1% by mass to 16% by mass, and further preferably 2% by mass to 12% by mass, from the viewpoints of image fix properties and ink stability.

Furthermore, it is preferable that the ink composition includes, as the second hydrophilic organic solvent, a hydrophilic organic solvent whose I/O value is selected from the range of 1.00 to 1.50, in an amount of 1% by mass to 16% by mass, and it is more preferable that the ink composition includes a hydrophilic organic solvent whose I/O value is selected from the range of 1.20 to 1.40, in an amount of 2% by mass to 12% by mass.

Furthermore, the content ratio of the second hydrophilic organic solvent to the first hydrophilic organic solvent in the ink composition for inkjet recording in exemplary embodiments of the invention (second hydrophilic organic solvent/ first hydrophilic organic solvent) is preferably 1/10 to 10/1, more preferably 1/4 to 4/1, and further preferably 1/2 to 2/1, from the viewpoints of image fix properties and ink stability.

The ink composition for inkjet recording in exemplary embodiments of the invention may further include another hydrophilic organic solvent, in addition to the first hydrophilic organic solvent and the second hydrophilic organic solvent. As for the other hydrophilic organic solvent, polyhydric alcohols are useful for the purpose of functioning as an anti-drying agent or a wetting agent, and examples include glycerin (I/O value: 5.00), ethylene glycol (I/O value: 2.00), diethylene glycol (I/O value: 5.00), triethylene glycol (I/O value: 3.43), propylene glycol (I/O value: 2.50), dipropylene glycol (I/O value: 2.00), 1,3-butanediol (I/O value: 2.50), 2,3-butanediol (I/O value: 2.50), 1,4-butanediol (I/O value: 2.50), 3-methyl-1,3-butanediol (I/O value: 2.00), 1,5-pentanediol (I/O value: 2.00), tetraethylene glycol (I/O value: 2.91), 1,6-hexanediol (I/O value: 1.67), 2-methyl-2,4-pentanediol (I/O value: 1.67), polyethylene glycol (I/O value depends on the number of repetition of the ethylene chain), 1,2,4-butanetriol (I/O value: 3.75), 1,2,6-hexanetriol (I/O value: 2.50), and the like. These may be used individually, or may be used in combination of two or more types.

For the purpose of functioning as a permeation agent, a polyol compound is preferable, and preferable examples of aliphatic diol include 2-ethyl-2-methyl-1,3-propanediol (I/O value: 1.67), 3,3-dimethyl-1,2-butanediol (I/O value: 1.67), 5-hexene-1,2-diol, 2-ethyl-1,3-hexanediol (I/O value: 2.00), and 2,2,4-trimethyl-1,3-pentanediol (I/O value: 1.88).

The content of the other hydrophilic organic solvent may be, for example, 16% by mass or less, and is preferably 12% by mass or less, and more preferably 8% by mass or less.

The hydrophilic organic solvent in the ink composition for inkjet recording in exemplary embodiments of the invention may be used individually, or may be used as mixtures of two or more types. The content of the hydrophilic organic solvent is preferably 1% by mass to 60% by mass, more preferably 5% by mass to 40% by mass, and particularly preferably 10% by mass to 30% by mass, from the viewpoints of stability and ejection properties.

The amount of addition of water used in exemplary embodiments of the invention is not particularly limited, but the amount is preferably 10% by mass to 99% by mass, more preferably 30% by mass to 80% by mass, and further preferably 50% by mass to 70% by mass, in the ink composition for inkjet recording, from the viewpoints of securing stability and ejection reliability.

(Other Additives)

The ink composition for inkjet recording in exemplary embodiments of the invention can further include other additives if necessary, in addition to the components mentioned above.

Examples of the other additives according to exemplary embodiments of the invention include known additives such as color fading inhibitor, emulsion stabilizer, permeation accelerator, ultraviolet absorber, preservative, mildew-proofing agent, pH adjusting agent, surface tension regulator, defoamer, viscosity adjusting agent, dispersant, dispersed stabilizer, anti-rust agent and chelating agent. These various additives may be added directly after the preparation of the ink composition for inkjet recording, or may be added during the preparation of the ink composition for inkjet recording. Specifically, the other additives and the like described in paragraphs [0153] to [0162] of JP-A No. 2007-100071 are included.

The surface tension adjusting agent may be a nonionic surfactant, a cationic surfactant, an anionic surfactant, a betaine surfactant or the like.

The amount of addition of the surface tension adjusting agent is preferably an amount of addition that adjusts the surface tension of the ink composition to 20 mN/m to 60 mN/m, more preferably an amount of addition that adjusts the surface tension to 20 mN/m to 45 mN/m, and further preferably an amount of addition that adjusts the surface tension to 25 mN/m to 40 mN/m, in order to spot the ink composition satisfactorily by the inkjet method.

The surface tension of the ink composition can be measured, for example, using a plate method at 25° C.

Specific examples of the surfactant as a hydrocarbon type preferably include anionic surfactants such as fatty acid salts, alkyl sulfuric acid ester salts, alkyl benzenesulfonates, alkyl naphthalenesulfonates, dialkyl sulfosuccinates, alkyl phosphoric acid ester salts, naphthalenesulfonic acid-formalin condensates and polyoxyethylene alkyl sulfuric acid salts; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyl amine, glycerin fatty acid ester and oxyethylene oxypropylene block copolymer. SURFYNOLS (trade name, products of Air Products & Chemicals) and OLFINE E1010 (trade name, surfactant, manufactured by Nisshin Chemical Industry Co., Ltd.) which are an acetylene type polyoxyethylene oxide surfactant) are preferably used. Furthermore, amine oxide type amphoteric surfactants such as N, N-dimethyl-N-alkyl amine oxide are preferred.

Additionally, materials described on pages (37) to (38) of JP-A No. 59-157636 and Research Disclosure No. 308119 (1989) as surfactants can be used.

When fluorocarbon (alkyl fluoride type) surfactants, silicone surfactants or the like, such as those described in JP-A Nos. 2003-322926, 2004-325707 and 2004-309806 are used, scratch resistance can be improved.

The surface tension regulator can be used as an antifoamer, and fluorine compounds, silicone compounds, chelating agents represented by EDTA, and the like can be used.

When the application of ink is carried out by the inkjet method, the viscosity of the ink composition in exemplary embodiments of the invention is preferably in the range of 1 mPa·s to 30 mPa·s, more preferably in the range of 1 mPa·s to 20 mPa·s, further preferably in the range of 2 mPa·s to 15 mPa·s, and particularly preferably in the range of 2 mPa·s to 10 mPa·s, from the viewpoints of the droplet ejection stability and rate of aggregation.

The viscosity of the ink composition can be measured by, for example, Brookfield Viscometer at 20° C.

The pH of the ink composition in exemplary embodiments of the invention is preferably from 7.5 to 10, and more preferably from 8 to 9, from the viewpoints of the ink stability and the aggregation rate. Note that, the pH of the ink composition is measured at 25° C. using a generally used pH meter (for example, MULTI-PARAMETER WATER QUALITY METER MM-60R (trade name), manufactured by DKK-Toa Corporation).

Further, the pH of the ink composition can be appropriately adjusted by using an acidic compound or a basic compound. As the acidic compound or the basic compound, generally used compounds can be used without any particular limitation.

<Ink Set>

The ink set in exemplary embodiments of the invention includes at least one of the ink compositions for inkjet recording, and at least one treatment liquid configured to form aggregates when contacted with the ink composition for inkjet recording.

The ink set in exemplary embodiments of the invention is used in an image forming method of using the ink composition for inkjet recording, and is particularly preferable as an ink set used in the image forming method as will be described later.

The ink set in exemplary embodiments of the invention can be used in the form of an ink cartridge holding these inks collectively or independently, and is preferable in view of the ease of handling. The ink cartridge constituted to include the ink set is known in the related technical field, and can be prepared as an ink cartridge by appropriately using a known method.

—Treatment Liquid—

The treatment liquid in exemplary embodiments of the invention is an aqueous composition which forms an aggregate when contacted with the ink composition for inkjet recording, and specifically, contains at least an aggregating component which may aggregate the dispersed particles such as the particles of coloring material (pigment etc.) in the ink composition to form an aggregate and, if necessary, may contain other components. By using the treatment liquid together with the ink composition, inkjet recording may be speeded up and, even when high speed recording is performed, an image having high density and high resolution is obtained.

(Aggregating Components)

The treatment liquid contains at least one aggregating component which forms an aggregate when contacted with the ink composition. By mixing the treatment liquid into the ink composition ejected by an inkjet method, aggregation of a pigment or the like which has been stably dispersed in the ink composition is promoted.

Examples of the treatment liquid include a liquid composition which may generate an aggregate by changing the pH of the ink composition. Thereupon, the pH (25° C.±1° C.) of the treatment liquid is preferably from 1 to 6, more preferably from 1.2 to 5, and further preferably from 1.5 to 4 from the viewpoints of the aggregation rate of the ink composition. In this case, the pH (25° C.±1° C.) of the ink composition used in the ejection step is preferably 7.5 to 9.5 (more preferably 8.0 to 9.0).

In exemplary embodiments of the invention, it is preferable that the pH (25° C.±1° C.) of the ink composition is 7.5 or higher, and the pH (25° C.±1° C.) of the treatment liquid is 3 to 5, from the viewpoint of the image density, the resolution, and speeding-up of inkjet recording.

The aggregating component may be used alone, or two or more of them may be used by mixing them.

The treatment liquid may be prepared by using at least one acidic compound as the aggregating component. As the acidic compound, compounds having a phosphoric acid group, a phosphonic acid group, a phosphinic acid group, a sulfuric acid group, a sulfonic acid group, a sulfinic acid group, or a carboxy group, or salts thereof (e.g. polyvalent metal salts) may be used. Among them, from the viewpoint of the aggregation rate of the ink composition, compounds having a phosphoric acid group or a carboxy group are more preferable, and compounds having a carboxy group are further preferable.

The compound having a carboxy group is preferably selected from polyacrylic acid, acetic acid, glycoric acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrole carboxylic acid, furan carboxylic acid, pyridine carboxylic acid, coumalic acid, thiophene carboxylic acid, nicotinic acid, or derivatives of such compound or salts thereof (for example, polyvalent metal salts, etc.) One of these compounds may be used alone or two or more of these compounds may be used together.

The treatment liquid in exemplary embodiments of the invention may further include an aqueous solvent (for example, water) in addition to the acidic compound described above.

The content of the acidic compound in the treatment liquid is, preferably, from 5% by mass to 95% by mass and, more preferably, from 10% by mass to 80% by mass based on the entire mass of the treatment liquid from the viewpoint of aggregation effect.

Preferred examples of the treatment liquid that may improve the high speed aggregation property include a treatment liquid including a polyvalent metal salt or a polyallyl amine. Examples of the polyvalent metal salt and a polyallyl amine include salts of alkaline earth metals belonging to group 2 of the periodic table (for example, magnesium and calcium), salts of a transition metal belonging to group 3 of the periodic table (for example, lanthanum), salts of a cation of a metal belonging to group 13 of the periodic table (for example, aluminum), salts of a lanthanide (for example, neodium), polyallylamine and polyallylamine derivatives. As the metal salts, carboxylic acid salts (such as, salts of formic acid, salts of acetic acid, and salts of benzoic acid), nitric acid salts, chlorides, and thiocyanic acid salts are preferred, and calcium salts or magnesium salt of a carboxylic acid (such as salts of formic acid, salts of acetic acid, and salts of benzoic acid), calcium salt of nitric acid or magnesium salt of nitric acid, calcium chloride, magnesium chloride, and calcium salt of thiocyanic acid or magnesium salt of thiocyanic acid are more preferred.

The content of the metal salt in the treatment liquid is preferably from 1% by mass to 10% by mass, more preferably, from 1.5% by mass to 7% by mass and, further preferably, from 2% by mass to 6% by mass.

The viscosity of the treatment liquid is, preferably, in a range from 1 mPa·s to 30 mPa·s, more preferably, in a range from 1 mPa·s to 20 mPa·s, further preferably, in a range from 2 mPa·s to 15 mPa·s, and, particularly preferably, in a range from 2 mPa·s to 10 mPa·s from the viewpoint of the aggregation rate of the ink composition. The viscosity is measured by using VISCOMETER TV-22 (trade name, manufactured by TOKI SANGYO CO., LTD.) under the condition at 20° C.

The surface tension of the treatment liquid is, preferably, from 20 mN/m to 60 mN/m, more preferably, from 20 mN/m to 45 mN/m and, further preferably, from 25 mN/m to 40 mN/m from the viewpoint of the aggregation rate of the ink composition. The surface tension is measured by using AUTOMATIC SURFACE TENSIOMETER CBVP-Z (trade name, manufactured by Kyowa Interface Science Co. Ltd.) under the condition of being at 25° C.

<Inkjet Image Forming Method>

The inkjet image forming method of the present invention is configured to include an ink discharging step of forming an image by ejecting the ink composition for inkjet recording described above, from an inkjet head equipped with a silicon nozzle plate, onto a recording medium and, if necessary, other steps.

In the present invention, it is preferable that the inkjet image forming method further include a treatment liquid applying step of applying a treatment liquid, which is capable of forming aggregates when contacted with the ink composition for inkjet recording, onto the recording medium.

[Ink Discharging Step]

The ink discharging step is a step of applying the above-described ink composition for inkjet recording in exemplary embodiments of the invention, from an inkjet head equipped with a silicon nozzle plate, onto a recording medium by an inkjet method. In this step, the ink composition can be selectively applied onto the recording medium, and a desired visible image can be formed. The details of the respective components and preferable embodiments in the ink composition of the present invention are as described above.

Image recording utilizing the inkjet method can be performed, specifically, by supplying energy thereby ejecting a liquid composition onto a desired recording medium, that is, plain paper, resin-coated paper, paper used exclusively for inkjet recording described, for example, in JP-A Nos. 8-169172, 8-27693, 2-276670, 7-276789, 9-323475, 62-238783, 10-153989, 10-217473, 10-235995, 10-337947, 10-217597, and 10-337947, films, common use paper for electrophotography, clothes, glass, metals, ceramics, etc. As the inkjet recording method suitable to exemplary embodiments of the invention, a method described in JP-A No. 2003-306623, in columns (0093) to (0105) may be applicable.

The inkjet method is not particularly limited and may be of any known system, for example, a charge control system of ejecting an ink utilizing an electrostatic attraction force, a drop on demand system of utilizing a vibration pressure of a piezo element (pressure pulse system), an acoustic inkjet system of converting electric signals into acoustic beams, irradiating them to an ink, and ejecting the ink utilizing a radiation pressure, and a thermal inkjet system of heating an ink to form bubbles and utilizing the resultant pressure (BUBBLEJET (registered trade mark)). Examples of the inkjet method include a system of injecting a number of ink droplets of low concentration, a so-called "photo-ink" each in a small volume, a system of improving an image quality using plural inks of a substantially identical hue and of different concentrations, and a system of using a colorless transparent ink.

The inkjet head used in the inkjet method may be either an on-demand system or a continuous system. The ejection system includes, specifically, for example, an electric-mechanical conversion system (for example, single cavity type, double cavity type, bender type, piston type, share mode type, and shared wall type, etc.), an electric-thermal conversion system (for example, thermal inkjet type, BUBBLEJET (registered trade mark) type, etc.), an electrostatic attraction system (for example, electric field control type, and slit jet type, etc.), and an electric ejecting system (for example, spark jet type, etc.) and any of the ejection systems may be used.

Ink nozzles, etc. used for recording by the inkjet method are not particularly limited but can be selected properly depending on the purpose.

Examples of the inkjet method include an inkjet method of a shuttle system in which a short serial head is used and recording is performed while allowing the head to scan in the lateral direction of a recording medium, and an inkjet method of a line system in which a line head in which recording elements are arranged corresponding to the entire region for one side of a recording medium is used. In the line system, an image can be recorded over the entire surface of the recording medium by allowing the recording medium to be scanned in the direction being at right angles to the direction of arranging the recording elements, in which a transportation system such as a carriage by which the short head moves for scanning is not necessary. Further, since complicated scanning control for the movement of the carriage and the recording medium is not necessary and only the recording medium is moved, higher recording speed can be attained as compared with the shuttle system. While the inkjet recording method in exemplary embodiments of the invention is applicable to any one of them, the effect of improving the ejection accuracy and the scratch resistance of the image is generally remarkable when the inkjet recording method is applied to the line system without performing dummy jetting.

Furthermore, in the ink discharging step according to exemplary embodiments of the invention, when a line method is employed, recording can be suitably performed not only using one type of the ink composition, but also using two or more types of ink compositions, by setting the ejection (droplet ejection) interval between the first ejected ink composition (n-th color (n≧1), for example, the second color) and the subsequently ejected ink composition ((n+1)-th color, for example, the third color), at 1 second or less. According to exemplary embodiments of the invention, by setting the ejection interval at 1 second or less in the line method, images having excellent scratch resistance and suppressed occurrence of blocking can be obtained under high speed recording that is faster than that conventionally obtained, while preventing the spreading caused by the interference between ink droplets or mixed colors. Further, images having excellent hue and drawing properties (reproducibility of fine lines or fine parts in the image) can be obtained.

The amount of ink droplet of the ink ejected from the inkjet head is preferably 0.5 pL (picoliter) to 6 pL, more preferably 1 pL to 5 pL, and further preferably 2 pL to 4 pL, from the viewpoint of obtaining high accuracy images.

(Inkjet Head Equipped with Silicon Nozzle Plate)

The inkjet head used in the image forming method in exemplary embodiments of the invention is equipped with a nozzle plate which is formed so that at least a part thereof includes silicon. FIG. 1 is a conceptual sectional view showing an example of the inner structure of the inkjet head.

As shown in FIG. 1, an inkjet head 100 is equipped with a nozzle plate 11 that has discharge ports (nozzles), and an ink supply unit 20 that is provided on the opposite side from the discharge direction of the nozzle plate. In the nozzle plate 11, plural discharge ports 12 that discharge ink are provided.

Figure 2:
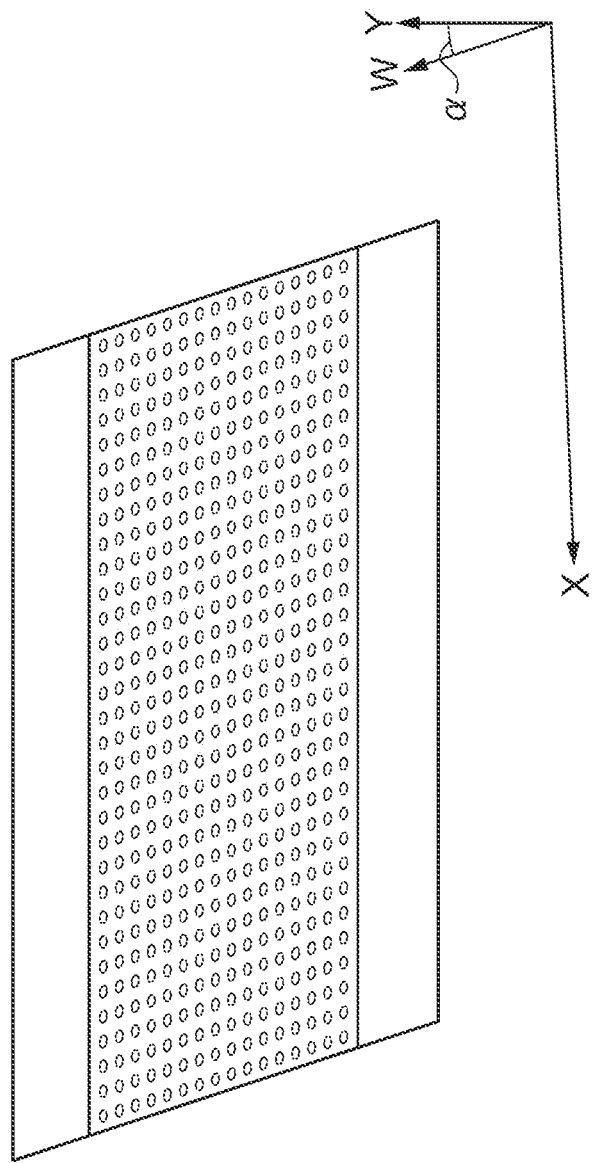
FIG. 2 is a schematic diagram showing an example of an array of discharge ports in a nozzle plate.

The nozzle plate 11 has 32×60 discharge ports (nozzles) in a two-dimensional array, as typically shown in FIG. 2. At least a part of this nozzle plate is formed from silicon. The nozzle plate has a structure in which silicon is exposed at the inner wall of nozzle openings and at the plate surface on the ink discharge direction side. Though not shown, a liquid repellent-film is provided on at least a part of the plate surface on the ink discharge direction side of the nozzle plate 11.

The ink supply unit 20 is equipped with plural pressure chambers 21, each of which communicates with each of the plural discharge ports 12 of the nozzle plate 11 through the nozzle communication path 22, plural ink supply channels 23 that supply ink to each of the plural pressure chambers 21, and a common liquid chamber 25 that supply ink to the plural ink supply channels 23, and a pressure generation unit 30 that transforms each of the plural pressure chambers 21.

The ink supply channel 23 is formed between the nozzle plate 11 and the pressure generation unit 30, and the ink that has been supplied to the common liquid chamber 25 is introduced to the ink supply channel 23. To this ink supply channel 23, an end of a supply adjusting path 24 that is connected with the pressure chamber 21 is connected, so that ink can be introduced to the pressure chamber 21 while reducing the amount of the ink that is supplied from the ink supply channel 23 to a required amount. Plural supply adjusting paths 24 are provided at the ink supply channels 23. Ink is supplied to the pressure chamber 21, that is provided adjacent to the pressure generation unit 30, through the ink supply channel 23.

Thus, it is possible to supply a large amount of ink to plural discharge ports.

The pressure generation unit 30 has a configuration in which a vibration plate 31, an adhesion layer 32, a lower electrode 33, a piezoelectric body layer 34, and an upper electrode 35 are laminated in this order from the pressure chamber 21 side. Further, the pressure generation unit 30 is connected with an electric wire that supplies drive signals from the outside. When the piezoelectric element is transformed according to image signals, ink is discharged from the nozzle 12 through the nozzle communication path 22.

Furthermore, in the neighborhood of the discharge port 12, a circulation restrictor 41 is provided, so that the ink is constantly recovered to a circuit 42. Thereby, the ink in the neighborhood of the discharge port is prevented from thickening, when ejection is not carried out.

—Treatment Liquid Applying Step—

The treatment liquid applying step performs imaging by applying a treatment liquid configured to form aggregates when contacted with the ink composition (in some case, simply referred as a treatment liquid), onto a recording medium, and placing the treatment liquid in contact with an ink composition. In this case, dispersed particles of the polymer particles or coloring material (for example, pigment) in the ink composition aggregate, and an image is fixed to the recording medium. In addition, the details and preferred embodiments of the respective components in the treatment liquid are as described previously.

Application of the treatment liquid may be performed by applying known methods such as a coating method, an inkjet method, and an immersion method. The coating method may be performed by a known coating method using a bar coater, an extrusion die coater, an air doctor coater, a blade coater, a rod coater, a knife coater, a squeeze coater, a reverse roll coater, or a bar coater. Details of the inkjet method are as described above.

The treatment liquid applying step may be provided before or after the ink discharging step using the ink composition.

In the invention, an embodiment in which the ink discharging step is provided after the treatment liquid is applied in a treatment liquid applying step, is preferable. That is, an embodiment in which, before discharging of the ink composition onto the recording medium, a treatment liquid for aggregating a coloring material (preferably pigment) in the ink composition is applied in advance, and the ink composition is discharged so as to contact the treatment liquid applied on the recording medium to form an image, is preferable. Thereby, inkjet recording may be speeded-up and, even when high speed recording is performed, an image having high density, and high resolution is obtained.

The amount of application of the treatment liquid is not particularly limited so long as the liquid can aggregate the ink composition, but can be an amount resulting in an amount of application of the aggregated component (for example, a carboxylic acid or a cationic organic compound having a valency of 2 or greater) of 0.1 g/m$^2$ or more. Among them, an amount resulting in an amount of application of the aggregated component of 0.1 to 1.0 g/m$^2$ is preferred, and an amount resulting in 0.2 to 0.8 g/m$^2$ is more preferred. When the amount of application of the aggregated component is 0.1 g/m$^2$ or more, the aggregation reaction proceeds satisfactorily, and when the amount is 1.0 g/m$^2$ or less, the glossiness is not very high, and is preferable.

According to exemplary embodiments of the invention, it is preferable to provide an ink discharging step after the treatment liquid applying step, and to further provide a heating drying step of heating and drying the treatment liquid on the recording medium, between the time after applying the treatment liquid onto the recording medium, and the time until the ink composition is discharged. By heating and drying the treatment liquid previously before the ink discharging step, ink coloring properties such as the prevention of spreading becomes good, and visible images having good color density and hue can be recorded.

The heating and drying can be carried out by a known heating means such as heater, an air blowing means utilizing air blowing such as dryer, or a means combining these. Examples of the heating method include a method of supplying heat by a heater or the like, from the surface of the recording medium opposite the surface applied with the treatment liquid, a method of blowing a warm air or hot air to the surface of the recording medium applied with the treatment liquid, a method of heating using an infrared heater, or the like. Heating can also be performed by combining these methods.

[Heating Fixing Step]

It is preferable that the inkjet recording method in exemplary embodiments of the invention includes, after the ink discharging step, a heating fixing step for heating and fixing the ink image formed by the application of the ink composition by placing the image in contact with a heated surface. By adding a heating fixing treatment, fixing of the image on the recording medium is achieved, and the resistance of the images to scratches can be further enhanced.

The heating method is not particularly limited, but methods of non-contact drying such as a method of heating with a heat generator such as a nichrome wire heater; a method of supplying warm air or hot air; and a method of heating with a halogen lamp, an infrared lamp or the like, may be suitably exemplified. The method of heating and pressing is not particularly limited, but methods of performing heating and fixing by contact such as, for example, a method of pressing a heat plate to the image-formed surface of the recording medium, and a method of passing the image through a pair of rollers using a heating and pressing apparatus equipped with a pair of heating and pressing rollers, a pair of heating and pressing belts, or a heating and pressing belt disposed on the side of the image-recorded surface of the recording medium and a retaining roller disposed on the opposite side, may be suitably mentioned.

The speed of conveyance of the recording medium when a heating and pressing roller or a heating and pressing belt is used is preferably in the range of 200 mm/second to 700 mm/second, more preferably 300 mm/second to 650 mm/second, and further preferably 400 mm/second to 600 mm/second.

—Recording Medium—

The inkjet recording method in exemplary embodiments of the invention is to record an image onto the recording medium.

The recording medium is not particularly limited, and general printing paper containing cellulose as a main component such as so-called high-quality paper, coated paper, and art paper may be used. The general printing paper containing cellulose as a main component absorbs and dries an ink relatively slowly, easily causes coloring material movement after a droplet is spotted, and allows image quality to easily deteriorate in image recording by a general inkjet method using an aqueous ink. However, according to the inkjet recording method in exemplary embodiments of the invention, coloring material movement is suppressed, and a high-quality image excellent in color density and hue may be recorded.

As the recording medium, a recording medium which is generally commercially available may be used, and examples include high quality paper such as OK PRINCE HIGH QUALITY (trade name, manufactured by Oji Paper Co., Ltd.), SHIORAI (trade name, manufactured by Nippon Paper Industries Co., Ltd.), and NEW NP HIGH QUALITY (trade name, manufactured by Nippon Paper Industries Co., Ltd.), fine coated paper such as OK EVER LITE COAT (trade name, manufactured by Oji Paper Co., Ltd.) and AURORA S (trade name, Nippon Paper Industries Co., Ltd.), light coated paper (A3) such as OK COAT L (trade name, manufactured by Oji Paper Co., Ltd.) and AURORA L (trade name, manufactured by Nippon Paper Industries Co., Ltd.), coated paper (A2, B2) such as OK TOP COAT+(trade name, manufactured by Oji Paper Co., Ltd.) and AURORA COAT (trade name, manufactured by Nippon Paper Industries Co., Ltd.), and an art paper (A1) such as OK KANEFUJI+(trade name, manufactured by Oji Paper Co., Ltd.) and TOKUBISHI ART (trade name, manufactured by Nippon Paper Industries Co., Ltd.). Further, various papers for photography for use in inkjet recording may be used.

Among them, from the viewpoint of that the effect of suppressing coloring material movement is great, and a high quality image having better color density and hue than the previous ones is obtained, a recording medium having a water absorption coefficient Ka of 0.05 $mL/m^2 \cdot ms^{1/2}$ to 0.5 $mL/m^2 \cdot ms^{1/2}$ is preferable, a recording medium having the water absorption coefficient Ka of 0.1 $mL/m^2 \cdot ms^{1/2}$ to 0.4 $mL/m^2 \cdot ms^{1/2}$ is more preferable, and a recording medium having the water absorption coefficient Ka of 0.2 $mL/m^2 \cdot ms^{1/2}$ to 0.3 $mL/m^2 \cdot ms^{1/2}$ is further preferable.

The water absorption coefficient Ka has the same meaning as described in JAPAN TAPPI, Pulp test method No. 51: 2000 (published by JAPAN TAPPI), and specifically, the absorption coefficient Ka is calculated from the difference in the amount of transfer of water at a contact time of 100 ms and a contact time of 900 ms, using an automatic scanning absorptometer KM500Win (manufactured by Kumagai Riki Kogyo Co., Ltd.).

Among the recording media, a so-called coated paper used in general offset printing is preferred. The coated paper is a product obtained by coating with a coating material the surface of a paper such as a high quality paper or neutral paper which is mainly based on cellulose and is not surface treated. The coated paper is likely to cause problems in product quality such as the gloss or scratch resistance of images, in the conventional image formation by aqueous inkjet recording, but in the inkjet recording method in exemplary embodiments of the invention, gloss irregularity is suppressed, and images having good glossiness and scratch resistance are obtained. Particularly, it is preferable to use a coated paper having a base paper and a coating layer containing kaolin and/or calcium bicarbonate. More specifically, art paper, coated paper, lightweight coated paper or finely coated paper is more preferred.

EXAMPLES

Hereinafter, the present invention will be specifically described with reference to Examples, but the present invention is not limited to these Examples. Unless stated otherwise, the "parts" and "%" are based on mass.

In addition, the weight average molecular weight was measured by gel permeation chromatography (GPC). HLC-8220 GPC (trade name, manufactured by Tosoh Corp.) was used for the GPC, and TSK GEL SUPER HZM-H, TSK GEL SUPER HZ4000, and TSK GEL SUPER HZ2000 (trade names, all manufactured by Tosoh Corp.) were used as the columns and were connected in a series of three. The eluent liquid was THF (tetrahydrofuran). For the conditions, the sample concentration was 0.35% by mass, the flow rate was 0.35 mL/min, the amount of sample injection was 10 µL, the measurement temperature was 40° C., and an RI detector was used. A calibration curve was produced from 8 samples of the 2standard sample TSK standard, "polystyrene": "F-40", "F-20", "F-4", "F-1", "A-5000", "A-2500", "A-1000" and "n-propylbenzene" (trade names) manufactured by Tosoh Corp.

<Production of Ink Composition for Inkjet Recording>

(Synthesis of Water-Insoluble Polymer Dispersant P-1)

88 g of methyl ethyl ketone was added to a 1000-mL three-necked flask equipped with an agitator and a cooling tube, and was heated to 72° C. under a nitrogen atmosphere. To this, a solution of 0.85 g of dimethyl-2,2'-azobisisobutyrate, 50 g of phenoxyethyl methacrylate, 13 g of methacrylic acid and 37 g of methyl methacrylate dissolved in 50 g of methyl ethyl ketone was added dropwise over 3 hours. After the addition was completed, the mixture was reacted for one more hour, and then a solution of 0.42 g of dimethyl-2,2'-azobisisobutyrate dissolved in 2 g of methyl ethyl ketone was added. The temperature was raised to 78° C., and the mixture was heated for 4 hours. The obtained reaction solution was precipitated two times in excess of hexane, and the precipitated resin was dried to obtain 96.5 g of a phenoxyethyl methacrylate/methyl methacrylate/methacrylic acid copolymer (copolymerization ratio by mass percent=50/37/13) (resin dispersant P-1).

The composition of the obtained resin dispersant P-1 was confirmed by $^1$H-NMR, and the weight average molecular weight (Mw) determined by GPC was 49,400. The acid value of the copolymer was determined by the method described in JIS Standards (JIS K0070: 1992), and the value was 84.8 mgKOH/g.

(Production of Colorant Particle Dispersion C)

10 parts of Pigment Blue 15:3 (Phthalocyanine Blue A220, manufactured by Dainichi Seka Co., Ltd.; cyan pigment), 4 parts of the polymer dispersant P-1, 42 parts of methyl ethyl ketone, 4.4 parts of a 1 mol/L aqueous NaOH solution, and 87.2 parts of ion-exchanged water were mixed, and the mixture was dispersed for 2 hours to 6 hours by a bead mill using zirconia beads having a diameter of 0.1 mm.

Methyl ethyl ketone was removed from the obtained dispersion under reduced pressure at 55° C., and a portion of water was further removed. Subsequently, centrifugation was performed for 30 minutes at 8000 rpm using a HIGH SPEED REFRIGERATED CENTRIFUGE 7550 (trade name, manufactured by Kubota Corp.) and using a 50mL centrifuge tube, to recover a supernatant in addition to the precipitate. Subsequently, the pigment concentration was determined from an absorbance spectrum, and thus a colorant particle dispersion C was obtained as a dispersion of resin-coated pigment particles (encapsulated pigment) with a pigment concentration of 10.2% by mass.

(Production of Self-Dispersing Polymer Particles)

540.0 g of methyl ethyl ketone was introduced into a two litter three-necked flask equipped with an agitator, a thermometer, a reflux cooling tube and a nitrogen gas inlet tube, and the temperature was increased to 75° C. under a nitrogen atmosphere. While maintaining the temperature in the reaction vessel at 75° C., a mixed solution formed from 216 g of methyl methacrylate (MMA), 280.8 g of isobornyl methacrylate (IBOMA), 43.2 g of methacrylic acid (MAA), 108 g of methyl ethyl ketone and 2.16 g of "V-601" (trade name, manufactured by Wako Pure Chemical Industries, Ltd.) was added dropwise at a constant rate so that dropping would be completed in 2 hours. After the addition was completed, a solution formed from 1.08 g of "V-601" and 15.0 g of methyl ethyl ketone was added, and the mixture was stirred for 2 hours at 75° C. A solution formed from 0.54 g of "V-601" and 15.0 g of methyl ethyl ketone was further added, and the mixture was stirred for 2 hours at 75° C. The temperature was increased to 85° C., and stirring was continued for 2 hours.

The weight average molecular weight (Mw) of the obtained copolymer was 63,000, and the acid value was 52.1 mgKOH/g.

Next, 588.2 g of the polymerized solution was weighed, and 165 g of isopropanol and 120.8 mL of a 1 mol/L aqueous NaOH solution were added. The temperature in the reaction vessel was increased to 80° C. Subsequently, 718 g of distilled water was added dropwise at a rate of 20 mL/min to achieve dispersion in water. Subsequently, the solvent was distilled off under the atmospheric pressure, while holding for 2 hours at a temperature of 80° C., for 2 hours at 85° C., and for 2 hours at 90° C. in the reactive vessel. The pressure inside the reaction vessel was further reduced to distill off isopropanol, methyl ethyl ketone and distilled water, and a dispersion of an example compound polymer (B-02) at a solids concentration of 26.0% was obtained.

The glass transition temperature of the obtained polymer (B-02) was measured by the following method, and was 160° C.

The polymer solution after polymerization in an amount of 0.5 g in terms of solid fraction was dried under reduced pressure at 50° C. for 4 hours to obtain a polymer solid fraction. The obtained polymer solid fraction was used to measure Tg by a differential scanning calorimeter (DSC) EXSTAR6220 (trade name) manufactured by SII Nanotechnology, Inc. The measurement conditions were such that 5 mg of a sample was sealed in an aluminum pan, and the value of the peak top of DDSC from the measurement data obtained at the time of second temperature increase in the following temperature profile under a nitrogen atmosphere, was designated as Tg.

from 30° C. to −50° C. (cooled at 50° C./min)
from −50° C. to 230° C. (heated at 20° C./min)
from 230° C. to −50° C. (cooled at 50° C./min)
from −50° C. to 230° C. (heated at 20° C./min)

Dispersions of self-dispersing polymer particles shown in the following Table 1 were produced in the same manner as in the case of the dispersion of the self-dispersing polymer particles (B-02). In the polymer composition in Table 1, MMA means methyl methacrylate, IBOMA means isobornyl methacrylate, DCPMA means dicyclopentanyl methacrylate, BzMA means benzyl methacrylate, and MAA means methacrylic acid. The values mean the composition ratio (mass basis) of each monomer.

TABLE 1

| Self-dispersing polymer | Polymer composition | Tg (° C.) | I/O value |
|---|---|---|---|
| B-01 | MMA/IBOMA/MAA 20/72/8 | 180 | 0.44 |
| B-02 | MMA/IBOMA/MAA 40/52/8 | 160 | 0.50 |
| B-03 | MMA/IBOMA/MAA 50/44/6 | 140 | 0.51 |
| B-04 | MMA/IBOMA/MAA 85/7/8 | 120 | 0.67 |
| B-05 | MMA/BzMA/MAA 85/7/8 | 100 | 0.67 |
| B-06 | MMA/DCPMA/MAA 20/72/8 | 160 | 0.47 |

(Production of Dispersion Liquid D-1 of Non Self-Dispersing Polymer Particles)

200 g of JONCRYL 537 (trade name, manufactured by BASF Japan Ltd.; Tg of 49° C., acid value of 40) (pH of 8.9), 9.0 g of sodium oleate (surfactant), and 191 g of ion-exchanged water were mixed to prepare a polymer particle dispersion liquid. Then, 200 mL of the polymer particle dispersion liquid was placed in a 250 mL-sized centrifugation poly bottle, and centrifugal separation was carried out using HIGH SPEED REFRIGERATED CENTRIFUGE 7750 (trade name, manufactured by KUBOTA Corporation) and HIGH CAPACITY ANGLE ROTOR AG-2506 (trade name) (centrifugal radius of 14.2 cm) at a rotating speed of 13,000 rpm (centrifugal acceleration of 26830×g) for one hour. After the centrifugation, the supernatant of the polymer particle dispersion liquid was filtered through a 32 µm-nylon mesh (trade name: N-NO380T, manufactured by NBA), and the filtrate was recovered. Thereby, a dispersion liquid D-1 of non self-dispersing polymer particles which had been subjected to a centrifugal processing was prepared.

(Preparation of Ink Composition for Inkjet Recording)

The dispersion of resin-coated pigment particles C, the self-dispersing polymer particles B-02 obtained as described above, and colloidal silica ("SNOWTEX C" (trade name), a volume average particle diameter 15 nm, manufactured by Nissan Chemical Industries, Ltd.) were used, and various components were mixed to obtain the following ink composition. This was filled in a disposable syringe made of plastic, and filtered through a PVDF 5-µm filter (MILLEX-SV, trade name, diameter 25 mm, manufactured by Millipore Corp.), to produce a cyan ink (ink composition for inkjet recording) C-01.

—Ink Composition—

| | |
|---|---|
| Cyan pigment (Pigment Blue 15:3) | 4% |
| Polymer dispersant P-1 (solid content) | 1.6% |
| Aqueous dispersion of polymer particles B-02 (solid content) | 5% |
| Colloidal silica (solid content) (trade name: SNOWTEX C, manufactured by Nissan Chemical Industries, Ltd., solid content 20%) | 1.5% |
| SANNIX GP250 (trade name, manufactured by Sanyo Chemical Industries, Ltd., hydrophilic organic solvent, I/O value 1.30) | 10% |
| Tripropylene glycol monomethyl ether (TPGmME) (manufactured by Wako Pure Chemical Industries, Ltd., hydrophilic organic solvent, I/O value 0.80) | 6% |
| OLFINE E1010 (trade name, manufactured by Nisshin Chemical Co., Ltd., surfactant) | 1% |
| Ion-exchanged water | amount to make up 100% in total |

Cyan inks C-02 to C-16 were respectively produced in substantially the same manner as described above, except that self-dispersing polymer particles listed in the following Table 2 or non self-dispersing polymer particles D-1 were respectively used instead of the self-dispersing polymer particles B-02 for the production of the cyan ink C-01, and the kind and amount of the colloidal silica for the production of the cyan ink C-01 were respectively replaced with ones listed in the following Table 2.

—Preparation of Treatment Liquid (1)—

Various components were mixed to achieve the following composition, to produce a treatment liquid (1). The property values of the treatment liquid (1) were such as a viscosity of 2.6 mPa·s, a surface tension of 37.3 mN/m, and pH 1.6 (25° C.).

—Composition of Treatment Liquid (1)—

| | |
|---|---|
| Malonic acid (divalent carboxylic acid, manufactured by Wako Pure Chemical Industries, Ltd.) | 15.0% |
| Diethylene glycol monomethyl ether (manufactured by Wako Pure Chemical Industries, Ltd.) | 20.0% |
| N-oleoyl-N-methyltaurine sodium (surfactant) | 1.0% |
| Ion-exchanged water | 64.0% |

<Image Formation and Evaluation>

An inkjet head equipped with a silicon nozzle plate as shown in FIG. 1 was prepared, and the storage tank connected to the inkjet head was refilled with the ink composition obtained as described above. Note that, a liquid-repellent film was provided in advance at the silicon nozzle plate, using a fluoroalkylsilane compound. A sheet of "TOKUBISHI ART DOUBLE-SIDED N" (trade name, manufactured by Mitsubishi Paper Mills, Ltd.) that served as a recording medium was fixed on the stage that was movable in a predetermined linear direction at a velocity of 500 mm/sec. The temperature of the stage was kept at 30° C. The treatment liquid (1) obtained as described above was coated on the recording medium using a bar coater to give a thickness of about 1.2 μm, and dried at 50° C. for 2 seconds immediately after coating.

TABLE 2

| Cyan ink | Self-dispersing polymer particles | | | Colloidal silica | | | Content ratio by mass | Remarks |
| | Kind | Tg (° C.) | I/O value | Kind | Volume average particle diameter (nm) | Content (% by mass) | (colloidal silica/self-dispersing polymer particles) | |
|---|---|---|---|---|---|---|---|---|
| C-01 | B-02 | 160 | 0.50 | SNOWTEX C | 15 | 1.5 | 0.3 | Present invention |
| C-02 | B-02 | 160 | 0.50 | SNOWTEX C | 15 | 0.5 | 0.1 | Present invention |
| C-03 | B-02 | 160 | 0.50 | SNOWTEX C | 15 | 0.05 | 0.01 | Present invention |
| C-04 | B-02 | 160 | 0.50 | SNOWTEX C | 15 | 0.005 | 0.001 | Present invention |
| C-05 | B-02 | 160 | 0.50 | SNOWTEX XS | 5 | 0.05 | 0.01 | Present invention |
| C-06 | B-02 | 160 | 0.50 | SNOWTEX CM | 25 | 0.05 | 0.01 | Present invention |
| C-07 | B-01 | 180 | 0.44 | SNOWTEX C | 15 | 0.05 | 0.01 | Present invention |
| C-08 | B-03 | 140 | 0.51 | SNOWTEX C | 15 | 0.05 | 0.01 | Present invention |
| C-09 | B-04 | 120 | 0.67 | SNOWTEX C | 15 | 0.05 | 0.01 | Present invention |
| C-10 | B-05 | 100 | 0.67 | SNOWTEX C | 15 | 0.05 | 0.01 | Present invention |
| C-11 | B-06 | 160 | 0.47 | SNOWTEX C | 15 | 0.05 | 0.01 | Present invention |
| C-12 | — | — | — | — | — | — | — | Comparative Example |
| C-13 | B-05 | 100 | 0.67 | — | — | — | — | Comparative Example |
| C-14 | B-02 | 160 | 0.50 | — | — | — | — | Comparative Example |
| C-15 | — | — | — | SNOWTEX C | 15 | 0.5 | — | Comparative Example |
| C-16 | D-1 | 49 | — | SNOWTEX C | 15 | 0.05 | 0.01 | Comparative Example |

After that, a 50% solid image with a size of 2 centimeters square was printed as follows. The inkjet head was fixed and arranged such that the direction of the line where nozzles were arranged (W direction in FIG. 2) was inclined at an angle of 75.7 degree (90°-α in FIG. 2) with respect to the perpendicular direction (principal scanning direction: X direction in FIG. 2) to the moving direction of the stage (sub scanning direction: Y direction in FIG. 2). While moving the recording medium at a constant speed along the sub scanning direction, the ink composition was ejected by a line system under the ejection conditions of an ink droplet amount of 2.4 pL, an ejection frequency of 24 kHz, and a resolution of 1200 dpi× 1200 dpi. Immediately after printing, the printed recording medium was dried at 60° C. for 3 seconds, and further passed between a pair of fixing rollers heated at 60° C. so that fixing processing was carried out at a nip pressure of 0.25 MPa and a nip width of 4 mm. In this manner, a sample for evaluation was obtained.

(Scratch Resistance Evaluation)

With regard to the sample for evaluation obtained as described above, immediately after printing, a sheet of unprinted "TOKUBISHI ART DOUBLE-SIDED N" (trade name, manufactured by Mitsubishi Paper Mills, Ltd.) was placed on the printed surface, and was rubbed back and forth ten times with a load of 150 kg/m². Scratches on the printed image and the degree of ink transfer to the white background portion of the unprinted recording medium (unused sample) were visually observed, and evaluation was made according to the following criteria. The evaluation results are shown in Table 3.

It should be noted that the evaluation C is a practically problematic level.

—Evaluation Criteria—

A: No scratch is observed at the printed image, and ink transfer is not recognized at all.

B: The printed image is slightly scratched, but remarkable ink transfer is hardly recognized.

C: The printed image is remarkably scratched, and/or ink transfer is clearly recognized.

(Blocking Evaluation)

In a manner substantially similar to that described above, the evaluation sample wholly printed with 100% solid image, was cut into two sheets with a size of 3.5 cm×4 cm, and the evaluation samples were mounted on an acrylic plate of 10 cm×10 cm in size (thickness 7 mm) such that the printed surfaces faced each other. Ten sheets of unprinted TOKUBISHI ART DOUBLE-SIDED N (trade name, manufactured by Mitsubishi Paper Mills, Ltd.) which had been cut to the same size, were further mounted in an overlapping manner on this evaluation sample. An acrylic plate of 10 cm×10 cm in size (thickness 7 mm) was further mounted thereon, and the assembly was left to stand for 12 hours under the conditions of an environment of 25° C. and 50% RH.

After standing still, 1 kg of weight (corresponding to a weight of 700 kg/m²) was mounted on the top acrylic plate, and the assembly was further left to stand for 24 hours under the conditions of temperature and relative humidity described as the "blocking conditions" in the following Table 3.

Furthermore, the assembly was stored for 2 hours under the conditions of an environment of 25° C. and 50% RH, and then the unprinted TOKUBISHI ART (trade name, unprinted paper) overlapped on the evaluation sample was peeled off. The ease of peeling and the adhesion after peeling at this time were observed by the naked eye, and an evaluation was made according to the following evaluation criteria. The result is shown in Table 3.

—Evaluation Criteria—

A: No adhesion on the printed surface

D: Adhesion occurred on the printed surface, and attachment of paper could be confirmed by visual inspection.

(Liquid Repellency Evaluation)

—Liquid-Repellent Film Immersion Test—

A specimen for evaluation was prepared by forming a liquid-repellent film (SAM film) on a silicon plate having a size of 2 cm×2 cm using a fluoroalkylsilane compound. Using the prepared specimen, the water contact angle on the liquid-repelling film was measured according to the method described below. The influence of the ink composition upon the liquid repellency of the liquid-repellent film was evaluated.

30 mL of the ink composition prepared as described above was weighed and placed in a 50 mL wide mouthed bottle (trade name: AIBOI HIROKUCHI BIN 50 mL, manufactured by AS ONE Corporation). Then, the above specimen was immersed in the ink composition, and left to stand for 72 hours while heating at 60° C. Thereafter, the specimen was taken out, washed with ultrapure water, and the water contact angle on the surface of the liquid-repellent film was measured.

For the measurement of the water contact angle, ultrapure water was used. The water contact angle was measured by an ordinary method using a contact angle meter (trade name: DM-500, manufactured by Kyowa Interface Science Co., Ltd.) under an environment of 25° C. and 50 RH %, and evaluation was made according to the following evaluation criteria.

It should be noted that the water contact angle before immersion in the ink composition was 106.5 degree, and that the evaluation D is a practically problematic level.

—Evaluation Criteria—

AA: 80 degree or higher

A: 60 degree or higher but lower than 80 degree

B: 40 degree or higher but lower than 60 degree

C.: 20 degree or higher but lower than 40 degree

D: Lower than 20 degree.

(Dischargeability Evaluation)

An inkjet head provided with a silicon nozzle plate as shown in FIG. 1 was fixed so that the moving direction of the stage was in the perpendicular direction to the nozzle arrangement direction. Note that, a liquid-repellent film was provided in advance at the silicon nozzle plate, using a fluoroalkylsilane compound. Then, the storage tank connected to the inkjet head was refilled with the ink composition obtained as described above. A sheet of "KASSAI SHASHIN SHIAGE PRO" (trade name, manufactured by Fujifilm Corporation) that served as a recording medium was fixed on the stage that was movable in the perpendicular direction to the nozzle arrangement direction.

Next, while moving the stage at a velocity of 248 mm/min, ink droplets were ejected at an ink droplet amount of 3.4 pL, at an ejection frequency of 10 kHz, and at a resolution (nozzle arrangement direction×conveying direction) of 75 dpi×1200 dpi, such that 2000 ink droplets per one nozzle were ejected to print 96 lines in a direction parallel to the conveying direction, thereby preparing a printed sample. The obtained printed sample was visually observed, and it was verified that the ink was ejected from all of the nozzles.

After ejecting the ink, the inkjet head was left in the state as it was for a predetermined time. Then, another sheet of the recording medium was fixed on the stage, and the ink was ejected again under substantially the same conditions to prepare another printed sample. The obtained printed sample was visually observed. The maximum left-standing period during which all the 96 nozzles were able to eject when 2000 ink droplets were ejected after leaving for the predetermined period was determined, which was used as an index for evaluating dischargeability (discharge recoverability). It is thought that the dischargeability is better, as the left-standing period, during which discharge failure does not occur, is longer. Evaluation criteria are set as follows.

It should be noted that the evaluation D is a practically problematic level.

—Evaluation Criteria—

A: The maximum left-standing period during which discharge failure does not occur is 45 minutes or more.

B: The maximum left-standing period during which discharge failure does not occur is 30 minutes or more but less than 45 minutes.

C: The maximum left-standing period during which discharge failure does not occur is 20 minutes or more but less than 30 minutes.

D: The maximum left-standing period during which discharge failure does not occur is less than 20 minutes.

illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

TABLE 3

| Cyan ink | Blocking conditions (temperature, relative humidity) | | | | Liquid repellency | Dischargeability | Scratch resistance | Remarks |
|---|---|---|---|---|---|---|---|---|
| | 50° C. 20% | 50° C. 30% | 50° C. 40% | 60° C. 20% | | | | |
| C-01 | A | A | A | A | A | C | A | Present invention |
| C-02 | A | A | A | A | A | B | A | Present invention |
| C-03 | A | A | A | A | B | A | A | Present invention |
| C-04 | A | A | A | A | C | A | A | Present invention |
| C-05 | A | A | A | A | A | A | A | Present invention |
| C-06 | A | A | A | A | C | B | A | Present invention |
| C-07 | A | A | A | A | B | A | A | Present invention |
| C-08 | A | A | D | A | B | A | A | Present invention |
| C-09 | A | A | D | D | B | A | A | Present invention |
| C-10 | A | D | D | D | B | A | A | Present invention |
| C-11 | A | A | A | A | A | C | A | Present invention |
| C-12 | A | A | A | A | B | A | C | Comparative Example |
| C-13 | A | D | D | D | D | A | A | Comparative Example |
| C-14 | A | A | A | A | D | A | A | Comparative Example |
| C-15 | A | A | A | A | A | B | C | Comparative Example |
| C-16 | A | D | D | D | B | D | B | Comparative Example |

It is realized from the above results that, in all cases using the ink composition for inkjet recording in exemplary embodiments of the invention, an image having excellent blocking resistance and excellent scratch resistance was formed. It is further realized that, in these cases, dischargeability was also excellent, and lowering of liquid repellency of the inkjet head was suppressed.

According to exemplary embodiments of the invention, an ink composition for inkjet recording, with which dischargeablity is excellent and lowering of liquid repellency of an inkjet head member is suppressed, an ink set including the ink composition, and an inkjet image forming method can be provided.

The foregoing description of the exemplary embodiments of the present invention has been provided for the purposes of 1. An inkjet ink composition comprising:
    self-dispersing polymer particles;
    colloidal silica; and
    colorant particles,
    each of the self-dispersing polymer particles including a structural unit derived from a hydrophilic monomer and a structural unit derived from a hydrophobic monomer, wherein
    a content of the colloidal silica is from 0.005% by mass to 0.05% by mass with respect to a total mass of the inkjet ink composition.

2. The inkjet ink composition according to claim 1, wherein the glass transition temperature of self-dispersing polymers which are included in the self-dispersing polymer particles is 120° C. or higher.

3. The inkjet ink composition according to claim 1, wherein an I/O value of self-dispersing polymers which are included in the self-dispersing polymer particles is from 0.20 to 0.55.

4. The inkjet ink composition according to claim 1 having a pH value in a range of from 7.5 to 10 at a temperature of 25° C.

5. The inkjet ink composition according to claim 1, wherein a volume average particle diameter of the colloidal silica is 25 nm or less.

6. The inkjet ink composition according to claim 1, wherein the content ratio of the colloidal silica with respect to the self-dispersing polymer particles (colloidal silica/self-dispersing polymer particles) in the inkjet ink composition is from 0.0001 to 0.1 on the basis of mass.

7. The inkjet ink composition according to claim 1, wherein the structural unit derived from the hydrophilic monomer comprises a carboxy group.

8. The inkjet ink composition according to claim 7, wherein an acid value of self-dispersing polymers which are included in the self-dispersing polymer particles is in a range of from 20 mgKOH/g to 200 mgKOH/g.

9. The inkjet ink composition according to claim 1, wherein the structural unit derived from the hydrophobic monomer comprises a cyclic aliphatic group.

10. The inkjet ink composition according to claim 9, wherein the hydrophobic monomer comprises at least one of a bicycloalkyl (meth)acrylate or a polycycloalkyl (meth)acrylate having three or more rings.

11. An ink set comprising the inkjet ink composition of claim 1 and a treatment liquid configured to form an aggregate when contacted with the inkjet ink composition.

12. An inkjet image forming method in which the inkjet ink composition of claim 1 is discharged from an inkjet head equipped with a silicon nozzle plate, onto a recording medium, thereby forming an image.

13. The inkjet image forming method of claim 12, further comprising applying a treatment liquid, which is capable of forming an aggregate when contacted with the inkjet ink composition, onto the recording medium.

14. The inkjet ink composition according to claim 2, wherein a content of a structural unit derived from alicyclic alkyl (meth)acrylate contained in the self-dispersing polymers is from 20% by mass to 90% by mass with respect to a total mass of the self-dispersing polymers.

15. The inkjet ink composition according to claim 14, wherein the self-dispersing polymers further comprise a structural unit derived from a monomer containing a dissociative group and at least one structural unit derived from a (meth)acrylate containing a linear chain alkyl group having 1 to 8 carbon atoms.

* * * * *